United States Patent
Bookbinder et al.

(10) Patent No.: US 11,555,133 B2
(45) Date of Patent: *Jan. 17, 2023

(54) FIBER COATING COMPOSITIONS WITH HIGH CURE SPEED

(71) Applicant: Corning Incorporated, Corning, NY (US)

(72) Inventors: Dana Craig Bookbinder, Corning, NY (US); Yangbin Chen, Lima, NY (US); Pushkar Tandon, Painted Post, NY (US); Ruchi Tandon, Painted Post, NY (US); Bin Yang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 858 days.

This patent is subject to a terminal disclaimer.

(21) Appl. No.: 16/266,235

(22) Filed: Feb. 4, 2019

(65) Prior Publication Data
US 2019/0249034 A1 Aug. 15, 2019

Related U.S. Application Data

(60) Provisional application No. 62/631,065, filed on Feb. 15, 2018.

(30) Foreign Application Priority Data

Mar. 9, 2018 (NL) ..................................... 2020563

(51) Int. Cl.
*C09D 175/16* (2006.01)
*C08G 18/75* (2006.01)
(Continued)

(52) U.S. Cl.
CPC .......... *C09D 175/16* (2013.01); *C03B 37/025* (2013.01); *C03C 25/106* (2013.01);
(Continued)

(58) Field of Classification Search
CPC .. C09D 175/16; C03C 25/106; C03C 25/1065
See application file for complete search history.

(56) References Cited

U.S. PATENT DOCUMENTS 5,527,835 A * 6/1996 Shustack ............. C03C 25/1065
522/42
6,376,571 B1 4/2002 Chawla et al.
(Continued)

OTHER PUBLICATIONS

Chinese Patent Application No. 201980013837.0, Office Action dated May 18, 2022, 5 pages (English Translation Only , Chinese Patent Office.
(Continued)

*Primary Examiner* — Michael M Dollinger
(74) *Attorney, Agent, or Firm* — Kevin L. Bray

(57) ABSTRACT

The present disclosure provides coating compositions and cured products formed from the coating compositions. The cured products can be formed at high cure speeds from the coating compositions and feature low Young's modulus, high tear strength, and/or high tensile toughness. The cured products can be used as primary coatings for optical fibers. The primary coatings provide good microbending performance and are resistant to defect formation during fiber coating processing and handling operations. The coating compositions include an oligomer, an alkoxylated monofunctional acrylate monomer, and preferably, an N-vinyl amide compound.

20 Claims, 3 Drawing Sheets

(51) Int. Cl.

| | |
|---|---|
| *C08G 18/48* | (2006.01) |
| *C08G 18/67* | (2006.01) |
| *C08G 18/12* | (2006.01) |
| *C09D 5/00* | (2006.01) |
| *G02B 6/02* | (2006.01) |
| *C03C 25/106* | (2018.01) |
| *C03C 25/326* | (2018.01) |
| *C03B 37/025* | (2006.01) |
| *C08G 18/24* | (2006.01) |
| *C08G 18/81* | (2006.01) |
| *G02B 1/04* | (2006.01) |
| *C03C 25/1065* | (2018.01) |
| *C09D 4/06* | (2006.01) |
| *C08F 290/06* | (2006.01) |
| *C08F 222/10* | (2006.01) |

(52) U.S. Cl.
CPC ........ *C03C 25/1065* (2013.01); *C03C 25/326* (2013.01); *C08F 222/1065* (2020.02); *C08F 290/067* (2013.01); *C08G 18/12* (2013.01); *C08G 18/246* (2013.01); *C08G 18/4825* (2013.01); *C08G 18/672* (2013.01); *C08G 18/6755* (2013.01); *C08G 18/758* (2013.01); *C08G 18/8175* (2013.01); *C09D 4/06* (2013.01); *C09D 5/002* (2013.01); *G02B 1/04* (2013.01); *G02B 6/02395* (2013.01); *C03B 2205/42* (2013.01); *G02B 1/045* (2013.01)

(56) References Cited

U.S. PATENT DOCUMENTS

| | | | |
|---|---|---|---|
| 2002/0068770 A1* | 6/2002 | Kashiwame | C08F 283/06 522/90 |
| 2002/0146225 A1* | 10/2002 | Bulters | C08G 18/8175 385/125 |
| 2003/0176522 A1* | 9/2003 | Komiya | C09D 4/06 522/71 |
| 2015/0071595 A1 | 3/2015 | Chen et al. | |
| 2018/0127593 A1 | 5/2018 | Chen et al. | |
| 2019/0092968 A1 | 3/2019 | Chen | |
| 2019/0366682 A1* | 12/2019 | Bookbinder | B32B 17/10119 |

OTHER PUBLICATIONS

Lee et al., "Evaluation of Structural Effects for Some Alkoxy Monomers in UV Curable Coatings", Retrieved from:http://radtech.org/proceedings/2008/papers/043.pdf, 2008, 5 pages.

Liu et al.; "Long Range Chirality Transfer in Free Radical Polymerization of Vinylterphenyl Monomers Bearing Chiral Alkoxy Groups"; Jounral of Polymer Science, Part A: Polymer Chemistry, 2013, 51, pp. 3674-3687.

Netherlands Patent Application No. 2020563 Search Report dated Oct. 31, 2018; 12 Pages; European Patent Office.

Tai Yeon Lee et al.; "Evaluation of Structural Effects for Some Alkoxy Monomers in UV Curable Coatings"; Radtech International UV and EB Curing Technology Expo & Conference 2008; vol. 1; pp. 341-345.

European Patent Application No. 19152749.8 Search Report dated Apr. 18, 2019; 4 Pages; European Patent Office.

\* cited by examiner

FIBER COATING COMPOSITIONS WITH HIGH CURE SPEED

This application claims the benefit of priority to Dutch Patent Application No. 2020563, filed on Mar. 9, 2018, which claims the benefit of priority to U.S. Provisional Application Ser. No. 62/631,065 filed on Feb. 15, 2018, the content of which is relied upon and incorporated herein by reference in its entirety.

FIELD OF THE DISCLOSURE

This disclosure pertains to coatings for optical fibers. More particularly, this disclosure pertains to coating compositions for primary coatings for optical fibers. Most particularly, this disclosure pertains to radiation-curable coating compositions with high cure speed that react to produce primary fiber coatings with low Young's modulus, high tear strength, and high tensile toughness.

BACKGROUND OF THE DISCLOSURE

The transmittance of light through an optical fiber is highly dependent on the properties of the coatings applied to the fiber. The coatings typically include a primary coating and a secondary coating, where the secondary coating surrounds the primary coating and the primary coating contacts the glass waveguide (core+cladding) portion of the fiber. The secondary coating is a harder material (higher Young's modulus) than the primary coating and is designed to protect the glass waveguide from damage caused by abrasion or external forces that arise during processing and handling of the fiber. The primary coating is a softer material (low Young's modulus) and is designed to buffer or dissipates stresses that result from forces applied to the outer surface of the secondary coating. Dissipation of stresses within the primary layer attenuates the stress and minimizes the stress that reaches the glass waveguide. The primary coating is especially important in dissipating stresses that arise when the fiber is bent. The bending stresses transmitted to the glass waveguide on the fiber needs to be minimized because bending stresses create local perturbations in the refractive index profile of the glass waveguide. The local refractive index perturbations lead to intensity losses for the light transmitted through the waveguide. By dissipating stresses, the primary coating minimizes bend-induced intensity losses.

To minimize bending losses, it is desirable to develop primary coating materials with increasingly lower Young's moduli. Primary coating materials with a Young's modulus below 1 MPa are preferred. As the Young's modulus of the primary coating is reduced, however, the primary coating is more susceptible to damage in the fiber manufacturing process or during fiber installation or deployment. Thermal and mechanical stresses that arise during the fiber coating process or during post-manufacture fiber handling and configuration processes (e.g. stripping, cabling and connecting operations) may lead to the formation of defects in the primary coating. The defect formation in the primary coating becomes more problematic as the Young's modulus of the primary coating material decreases.

In the manufacture of optical fibers, a fiber is drawn from a glass preform, thinned to an appropriate diameter (e.g. 125 µm), coated with primary and secondary coatings, and wound on a spool for storage. There is currently a desire to increase draw speed to improve the efficiency of fiber manufacturing. One factor that limits draw speed is the speed of forming the coatings on the fiber. The primary and secondary coatings are typically formed by first applying primary and secondary coating compositions to the glass fiber and then reacting the coating compositions to form primary and secondary coatings. Typically, the primary and secondary coating compositions include photoinitiators and radiation-curable monomers and/or oligomers, and the reaction to form primary and secondary coatings is induced by curing with radiation. As draw speed increases, the need for coating compositions having faster cure speeds becomes more pressing. In particular, there is a need for coating compositions with fast cure speed that can provide primary coating materials with a low Young's modulus that are resistant to stress-induced defect formation during fiber manufacture and handling.

SUMMARY

The present disclosure provides coating compositions and cured products formed from the coating compositions. The cured products can be formed at high cure speeds from the coating compositions and feature low Young's modulus, high tear strength, and high tensile toughness. The cured products can be used as primary coatings for optical fibers. The primary coatings provide good microbending performance and are resistant to defect formation during fiber coating processing and handling operations.

The present disclosure extends to:
A composition comprising:
  (i) an oligomer, the oligomer comprising:
  a polyether urethane diacrylate compound having the formula:

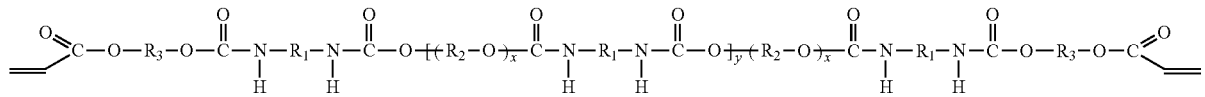

and a di-adduct compound having the formula:

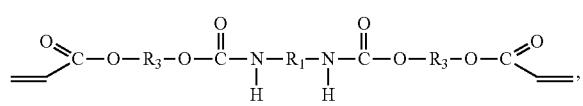

wherein
$R_1$, $R_2$ and $R_3$ are independently selected from linear alkylene groups, branched alkylene groups, or cyclic alkylene groups;
y is 1, 2, 3, or 4;
x is greater than 40;
the di-adduct compound is present in the oligomer in an amount of at least 1.0 wt %, and
the oligomer is present in the composition in an amount greater than 30 wt %; and

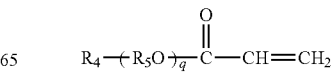

wherein $R_4$ is a linear or branched alkyl group, $R_5$ is a linear or branched alkylene group, q is in the range from 1-10, and the monomer is present in the composition in an amount greater than 25 wt %.

The present disclosure extends to:

A cured product of a composition comprising:
(i) an oligomer, the oligomer comprising:
a polyether urethane diacrylate compound having the formula:

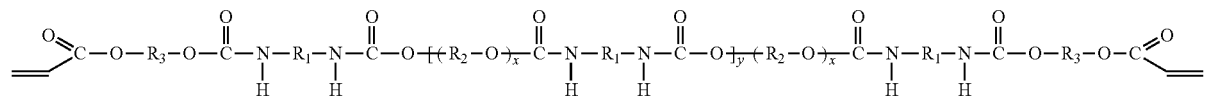

and a di-adduct compound having the formula:

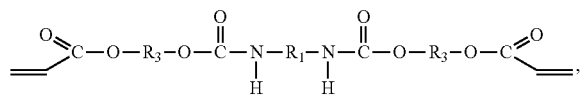

wherein
$R_1$, $R_2$ and $R_3$ are independently selected from linear alkylene groups, branched alkylene groups, or cyclic alkylene groups;
y is 1, 2, 3, or 4;
x is greater than 40;
the di-adduct compound is present in the oligomer in an amount of at least 2.0 wt %, and
the oligomer is present in the composition in an amount greater than 30 wt %;
(ii) a monomer, the monomer comprising an alkoxylated compound having the formula

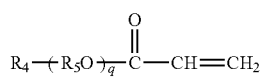

wherein $R_4$ is a linear or branched alkyl group, $R_5$ is a linear or branched alkylene group, q is in the range from 1-10; and the monomer is present in the composition in an amount greater than 35 wt %; and
(iii) a photoinitiator.

The present disclosure extends to:

A method of forming a cured product comprising curing a composition comprising:
(i) an oligomer, the oligomer comprising:
a polyether urethane diacrylate compound having the formula:

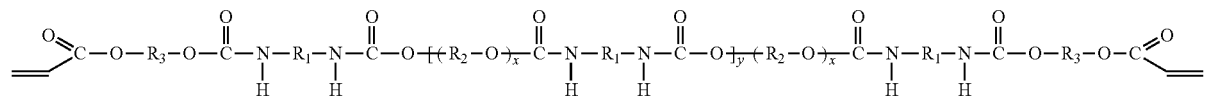

and a di-adduct compound having the formula:

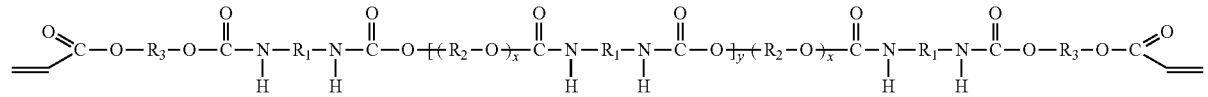

wherein
$R_1$, $R_2$ and $R_3$ are independently selected from linear alkylene groups, branched alkylene groups, or cyclic alkylene groups;
y is 1, 2, 3, or 4;
x is greater than 40;
the di-adduct compound is present in the oligomer in an amount of at least 2.0 wt %, and
the oligomer is present in the composition in an amount greater than 30 wt %;
(ii) a monomer, the monomer comprising an alkoxylated compound having the formula

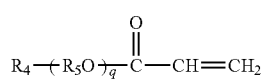

wherein $R_4$ is a linear or branched alkyl group, $R_5$ is a linear or branched alkylene group, q is in the range from 1-10; and the monomer is present in the composition in an amount greater than 35 wt %; and
(iii) a photoinitiator.

The present disclosure extends to:

A method of coating an optical fiber comprising:
applying a coating composition to an optical fiber, said optical fiber moving at a draw speed greater than 45 m/s, said coating composition comprising:

(i) an oligomer, the oligomer comprising:

a polyether urethane diacrylate compound having the formula:

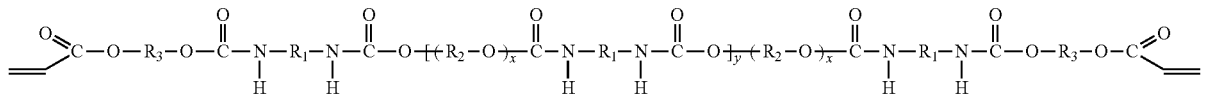

and a di-adduct compound having the formula:

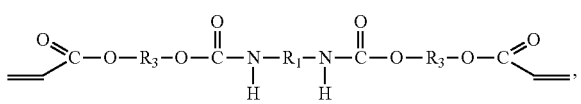

wherein
$R_1$, $R_2$ and $R_3$ are independently selected from linear alkylene groups, branched alkylene groups, or cyclic alkylene groups;
y is 1, 2, 3, or 4;
x is greater than 40;
the di-adduct compound is present in the oligomer in an amount of at least 2.0 wt %, and
the oligomer is present in the composition in an amount greater than 30 wt %;
(ii) a monomer, the monomer comprising an alkoxylated compound having the formula

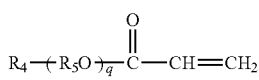

wherein $R_4$ is a linear or branched alkyl group, $R_5$ is a linear or branched alkylene group, q is in the range from 1-10; and the monomer is present in the composition in an amount greater than 35 wt %; and
(iii) a photoinitiator; and
curing the coating composition to form a coating on the fiber.

The present disclosure further includes fiber coatings and cured products formed from the coating compositions described herein. The fiber coatings and cured products feature low Young's modulus, high tear strength, and high tensile toughness.

The present disclosure further includes an optical fiber coated with a coating formed from a composition disclosed herein, wherein the optical fiber includes a glass waveguide and the coating surrounds the glass waveguide.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

Figure 1:
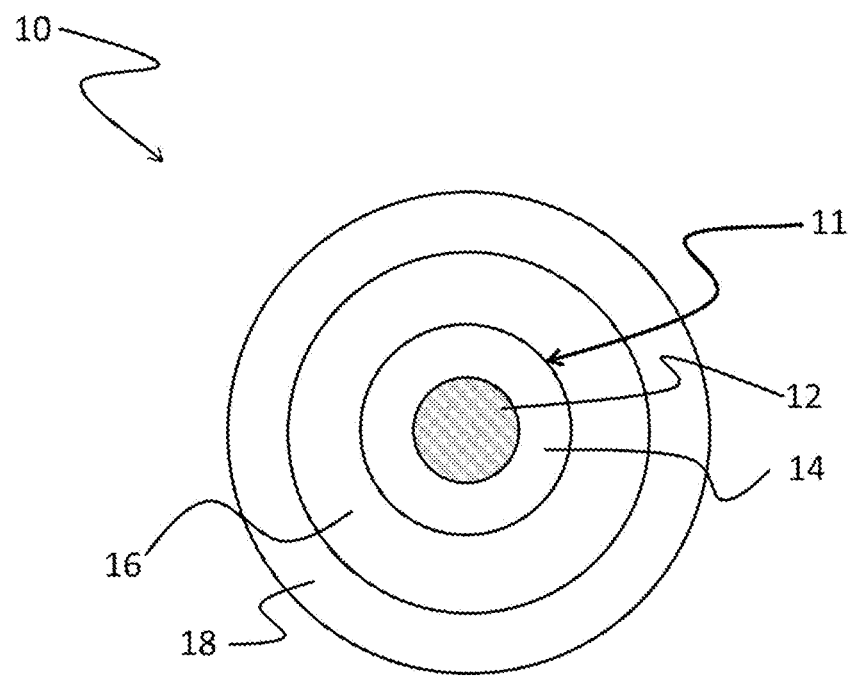
FIG. 1 is a schematic view of a coated optical fiber according one embodiment.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purpose of describing particular aspects only and is not intended to be limiting.

In this specification and in the claims which follow, reference will be made to a number of terms which shall be defined to have the following meanings:

"Include," "includes," or like terms means encompassing but not limited to, that is, inclusive and not exclusive.

The term "about" references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise.

The coatings described herein are formed from curable coating compositions. Curable coating compositions include one or more curable components. As used herein, the term "curable" is intended to mean that the component, when exposed to a suitable source of curing energy, includes one or more curable functional groups capable of forming covalent bonds that participate in linking the component to itself or to other components of the coating composition. The product obtained by curing a curable coating composition is referred to herein as the cured product of the composition. The cured product is preferably a polymer. The curing process is induced by energy. Forms of energy include radiation or thermal energy. In a preferred embodiment, curing occurs with radiation. Curing induced by radiation is referred to herein as radiation curing or photocuring. A radiation-curable component is a component that can be induced to undergo a curing reaction when exposed to radiation of a suitable wavelength at a suitable intensity for a sufficient period of time. Suitable wavelengths include wavelengths in the infrared, visible, or ultraviolet portion of the electromagnetic spectrum. The radiation curing reaction preferably occurs in the presence of a photoinitiator. A radiation-curable component may also be thermally curable. Similarly, a thermally-curable component is a component that can be induced to undergo a curing reaction when exposed to thermal energy of sufficient intensity for a sufficient period of time. A thermally curable component may also be radiation curable.

A curable component includes one or more curable functional groups. A curable component with only one curable functional group is referred to herein as a monofunctional curable component. A curable component having two or more curable functional groups is referred to herein as a multifunctional curable component. Multifunctional curable components include two or more functional groups capable of forming covalent bonds during the curing process and can introduce crosslinks into the polymeric network formed during the curing process. Multifunctional curable components may also be referred to herein as "crosslinkers" or "curable crosslinkers". Curable components include curable monomers and curable oligomers. Examples of functional groups that participate in covalent bond formation during the curing process are identified hereinafter.

In the description that follows, various components of coating compositions will be discussed and the amounts of particular components in the coating composition will be specified in terms of weight percent (wt %) or parts per hundred (pph). The components of the coating composition include base components and additives. The concentration of base components will be expressed in terms of wt % and the concentration of additives will be expressed in terms of pph.

As used herein, the weight percent of a particular base component refers to the amount of the component present in the coating composition on a basis that excludes additives. The additive-free coating composition includes only base components and is referred to herein as a base composition or base coating composition. Any curable component(s) and polymerization initiator(s) present in a coating composition are regarded individually as base components and collectively as a base composition. In one aspect, the base composition includes a radiation-curable component and a photoinitiator. The radiation-curable component may be a radiation-curable crosslinker or a radiation-curable diluent. The radiation-curable component may be a monomer or an oligomer. In different aspects, the base composition includes one or more radiation-curable components and one or more polymerization initiators. The collective amount of base components in a coating composition is regarded herein as equaling 100 weight percent.

Additives are optional and may include one or more of a UV absorber, an adhesion promoter, an antioxidant, a catalyst, a carrier or surfactant, a tackifier, a stabilizer, and an optical brightener. Representative additives are described in more detail hereinbelow. The amount of additives introduced into the coating composition is expressed herein in parts per hundred (pph) relative to the base composition. For example, if 1 g of a particular additive is added to 100 g of base composition, the concentration of additive is expressed herein as 1 pph.

The term "molecular weight" when applied to polyols means number average molecular weight.

Reference will now be made in detail to illustrative embodiments of the present description.

The present description relates to curable coating compositions, coatings formed from the curable coating compositions, and coated articles coated or encapsulated by the coating cured from the curable coating compositions. In a preferred embodiment, the curable coating composition is a composition for forming coatings for optical fibers, the coating is an optical fiber coating, and the coated article is a coated optical fiber. The present description also relates to methods of making curable coating compositions, methods of forming coatings from the curable coating compositions, and methods of coating fibers with the curable coating composition. The coating compositions have high cure speed and coatings formed from the coating compositions have high tensile toughness and high tear strength.

One embodiment relates to a coated optical fiber. An example of a coated optical fiber is shown in schematic cross-sectional view in FIG. 1. Coated optical fiber 10 includes a glass optical fiber 11 surrounded by primary coating 16 and secondary coating 18. In a preferred embodiment, the primary coating 16 is the cured product of a curable coating composition in accordance with the present description.

The glass fiber 11 is an uncoated optical fiber including a core 12 and a cladding 14, as is familiar to the skilled artisan. Core 12 has a higher refractive index than cladding 14 and glass fiber 11 functions as a waveguide. In many applications, the core and cladding have a discernible core-cladding boundary. Alternatively, the core and cladding can lack a distinct boundary. One such fiber is a step-index fiber. Another such fiber is a graded-index fiber, which has a core whose refractive index varies with distance from the fiber center. A graded-index fiber is formed basically by diffusing the glass core and cladding layer into one another. The cladding can include one or more layers. The one or more cladding layers can include an inner cladding layer that surrounds the core and an outer cladding layer that surrounds the inner cladding layer. The inner cladding layer and outer cladding layer differ in refractive index. For example, the inner cladding layer may have a lower refractive index than the outer cladding layer. A depressed index layer may also be positioned between the inner cladding layer and outer cladding layer.

The optical fiber may also be single or multi-moded at the wavelength of interest, e.g., 1310 or 1550 nm. The optical fiber may be adapted for use as a data transmission fiber (e.g. SMF-28®, LEAF®, and METROCOR®, each of which is available from Corning Incorporated of Corning, N.Y.)

Alternatively, the optical fiber may perform an amplification, dispersion compensation, or polarization maintenance function. The skilled artisan will appreciate that the coatings described herein are suitable for use with virtually any optical fiber for which protection from the environment is desired.

The primary coating 16 preferably has a higher refractive index than the cladding of the optical fiber in order to allow it to strip errant optical signals away from the optical fiber core. The primary coating should maintain adequate adhesion to the glass fiber during thermal and hydrolytic aging, yet be strippable from the glass fiber for splicing purposes. The primary coating typically has a thickness in the range of 25-40 μm (e.g. about 32.5 μm). Primary coatings are typically formed by applying a curable coating composition to the glass fiber as a viscous liquid and curing, as will be described in more detail herein below.

Figure 2:
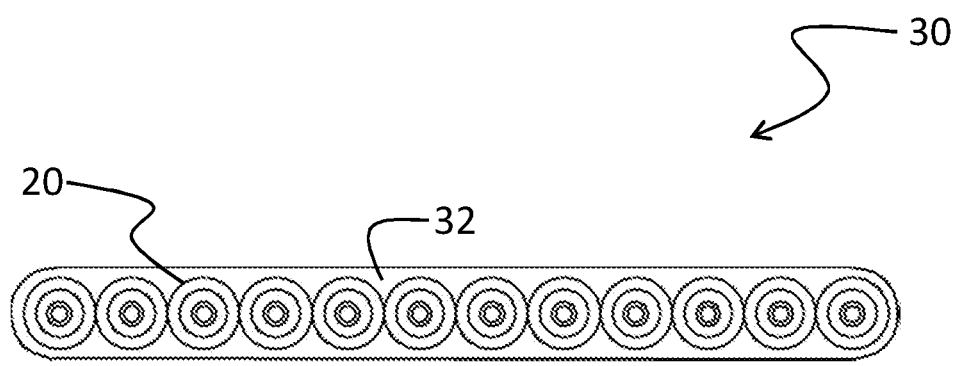
FIG. 2 is a schematic view of a representative optical fiber ribbon. The representative optical fiber ribbon includes twelve coated optical fibers.

FIG. 2 illustrates an optical fiber ribbon 30. The ribbon 30 includes a plurality of optical fibers 20 and a matrix 32 encapsulating the plurality of optical fibers. Optical fibers 20 include a core glass region, a cladding glass region, a primary coating, and a secondary coating as described above. Optical fibers 20 may also include an ink layer. The secondary coating may include a pigment. The optical fibers 20 are aligned relative to one another in a substantially planar and parallel relationship. The optical fibers in fiber optic ribbons are encapsulated by the ribbon matrix 32 in any known configuration (e.g., edge-bonded ribbon, thin-encapsulated ribbon, thick-encapsulated ribbon, or multilayer ribbon) by conventional methods of making fiber optic ribbons. In FIG. 2, the fiber optic ribbon 30 contains twelve (12) optical fibers 20; however, it should be apparent to those skilled in the art that any number of optical fibers 20 (e.g., two or more) may be employed to form fiber optic ribbon 30 disposed for a particular use. The ribbon matrix 32 can be formed from the same composition used to prepare a secondary coating, or the ribbon matrix 32 can be formed from a different composition that is otherwise compatible for use.

The present disclosure provides radiation-curable coating compositions, radiation-curable components for coating compositions, cured products of the radiation-curable coating compositions, primary coatings for optical fibers, and optical fibers coated with the cured product of a radiation-curable coating composition.

In one aspect, the present disclosure provides primary coatings that exhibit low Young's moduli and high resistance to defect formation during fiber manufacture and handling. Resistance of a primary coating to defect initiation correlates with tensile toughness and resistance of a primary coating to defect propagation correlates with tear strength. The primary coatings feature high tensile toughness and high tear strength, thus providing high resistance to the formation and extension of coating defects.

The present coatings are the cured product of coating compositions that include an oligomer, a monomer, and a photoinitiator. The coating compositions may include one or more oligomers, one or more monomers, and/or one or more photoinitiators. The oligomer(s) and monomer(s) are curable components of the coating composition, preferably radiation-curable. The coating compositions optionally include one or more additives. Additives include a UV absorber, an adhesion promoter, an antioxidant, a catalyst, a carrier or surfactant, a tackifier, a stabilizer, and an optical brightener. The coating compositions feature high cure speed believed to result from unexpected synergy between the oligomer(s) and monomer(s) included as components. The high cure speed is achieved while retaining tear strength and tensile toughness characteristics needed for primary coatings of optical fibers.

The oligomer includes a polyether urethane diacrylate compound and a di-adduct compound. In one embodiment, the polyether urethane diacrylate compound has a linear molecular structure. In one embodiment, the oligomer is formed from a reaction between a diisocyanate compound, a polyol compound, and a hydroxy acrylate compound, where the reaction produces a polyether urethane diacrylate compound as a primary product (majority product) and a di-adduct compound as a byproduct (minority product). The reaction forms a urethane linkage upon reaction of an isocyanate group of the diisocyanate compound and an alcohol group of the polyol. The hydroxy acrylate compound reacts to quench residual isocyanate groups that are present in the composition formed from reaction of the diisocyanate compound and polyol compound. As used herein, the term "quench" refers to conversion of isocyanate groups through a chemical reaction with hydroxyl groups of the hydroxy acrylate compound. Quenching of residual isocyanate groups with a hydroxy acrylate compound converts terminal isocyanate groups to terminal acrylate groups.

A preferred diisocyanate compound is represented by molecular formula (I):

$$O{=}C{=}N{-}R_1{-}N{=}C{=}O \tag{I}$$

which includes two terminal isocyanate groups separated by a linkage group $R_1$. In one embodiment, the linkage group $R_1$ includes an alkylene group. The alkylene group of linkage group $R_1$ is linear (e.g. methylene or ethylene), branched (e.g. isopropylene), or cyclic (e.g. cyclohexylene, phenylene). The cyclic group is aromatic or non-aromatic. In some embodiments, the linkage group $R_1$ is 4,4'-methylene bis(cyclohexyl) group and the diisocyanate compound is 4,4'-methylene bis(cyclohexyl isocyanate). In some embodiments, the linkage group $R_1$ lacks an aromatic group, or lacks a phenylene group, or lacks an oxyphenylene group.

A polyol is a compound having two or more reactive OH groups and a repeating alkoxylene group. Preferably at least one of the reactive OH groups is a terminal OH group. Preferred polyols include diols with two terminal reactive OH groups. Such polyols can be represented by the formula (II):

$$H{-}O{-\!\!\!\!+\!\!\!\!-}R_2{-}O{-\!\!\!\!\!\!+\!\!\!\!\!\!}_x H \tag{II}$$

where $R_2$ is an organic group, $-O-R_2-$ is a repeating alkoxylene group, and x is an integer. Preferably, x is greater than 20, or greater than 40, or greater than 50, or greater than 75, or greater than 100, or greater than 125, or greater than 150, or in the range from 20-500, or in the range from 20-300, or in the range from 30-250, or in the range from 40-200, or in the range from 60-180, or in the range from 70-160, or in the range from 80-140. $R_2$ is preferably a linear or branched alkylene group, such as methylene, ethylene, propylene (normal, iso or a combination thereof), or butylene (normal, iso, secondary, tertiary, or a combination thereof). The polyol may be a polyalkylene oxide, such as polyethylene oxide, or a polyalkylene glycol, such as polypropylene glycol. Polypropylene glycol is a preferred polyol. The molecular weight of the polyol is greater than 1000 g/mol, or greater than 2500 g/mol, or greater than 5000 g/mol, or greater than 7500 g/mol, or greater than 10000 g/mol, or in the range from 1000 g/mol-20000 g/mol, or in the range from 2000 g/mol-15000 g/mol, or in the range from 2500 g/mol-12500 g/mol, or in the range from 2500 g/mol-10000 g/mol, or in the range from 3000 g/mol-7500 g/mol, or in the range from 3000 g/mol-6000 g/mol, or in the range from 3500 g/mol-5500 g/mol. In some embodiments, the polyol is polydisperse and includes molecules spanning a range of molecular weights such that the totality of molecules combine to provide the number average molecular weight specified hereinabove.

The unsaturation of the polyol is less than 0.25 meq/g, or less than 0.15 meq/g, or less than 0.10 meq/g, or less than 0.08 meq/g, or less than 0.06 meq/g, or less than 0.04 meq/g, or less than 0.02 meq/g, or less than 0.01 meq/g, or less than 0.005 meq/g, or in the range from 0.001 meq/g-0.15 meq/g, or in the range from 0.005 meq/g-0.10 meq/g, or in the range from 0.01 meq/g-0.10 meq/g, or in the range from 0.01 meq/g-0.05 meq/g, or in the range from 0.02 meq/g-0.10 meq/g, or in the range from 0.02 meq/g-0.05 meq/g. As used herein, unsaturation refers to the value determined by the standard method reported in ASTM D4671-16. In the method, the polyol is reacted with mercuric acetate and methanol in a methanolic solution to produce acetoxymercuricmethoxy compounds and acetic acid. The reaction of the polyol with mercuric acetate is equimolar and the amount of acetic acid released is determined by titration with alcoholic potassium hydroxide to provide the measure of unsaturation used herein. To prevent interference of excess mercuric acetate on the titration of acetic acid, sodium bromide is added to convert mercuric acetate to the bromide.

The reaction further includes addition of a hydroxy acrylate compound to react with terminal isocyanate groups present in unreacted starting materials (e.g. the diisocyanate compound) or products formed in the reaction of the diisocyanate compound with the polyol (e.g. urethane compounds with terminal isocyanate groups). The hydroxy acrylate compound reacts with terminal isocyanate groups to provide terminal acrylate groups for one or more constituents of the oligomer. In some embodiments, the hydroxy acrylate compound is present in excess of the amount needed to fully convert terminal isocyanate groups to terminal acrylate groups. The oligomer includes a single polyether urethane diacrylate compound or a combination of two or more polyether urethane diacrylate compounds.

The hydroxy acrylate compound is represented by molecular formula (III):

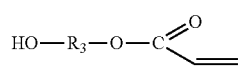

(III)

where $R_3$ includes an alkylene group. The alkylene group of $R_3$ is linear (e.g. methylene or ethylene), branched (e.g. isopropylene), or cyclic (e.g. phenylene). In some embodiments, the hydroxy acrylate compound includes substitution of the ethylenically unsaturated group of the acrylate group. Substituents of the ethylenically unsaturated group include alkyl groups. An example of a hydroxy acrylate compound with a substituted ethylenically unsaturated group is a hydroxy methacrylate compound. The discussion that follows describes hydroxy acrylate compounds. It should be understood, however, that the discussion applies to substituted hydroxy acrylate compounds and in particular to hydroxy methacrylate compounds.

In different embodiments, the hydroxy acrylate compound is a hydroxyalkyl acrylate, such as 2-hydroxyethyl acrylate. The hydroxy acrylate compound may include water at residual or higher levels. The presence of water in the hydroxy acrylate compound may facilitate reaction of isocyanate groups to reduce the concentration of unreacted isocyanate groups in the final reaction composition. In various embodiments, the water content of the hydroxy acrylate compound is at least 300 ppm, or at least 600 ppm, or at least 1000 ppm, or at least 1500 ppm, or at least 2000 ppm, or at least 2500 ppm.

In the foregoing exemplary molecular formulas (I), III), and (III), the groups $R_1$, $R_2$, and $R_3$ are all the same, are all different, or include two groups that are the same and one group that is different.

The diisocyanate compound, hydroxy acrylate compound and polyol are combined simultaneously and reacted, or are combined sequentially (in any order) and reacted. In one embodiment, the oligomer is formed by reacting a diisocyanate compound with a hydroxy acrylate compound and reacting the resulting product composition with a polyol. In another embodiment, the oligomer is formed by reacting a diisocyanate compound with a polyol compound and reacting the resulting product composition with a hydroxy acrylate compound.

The oligomer is formed from a reaction of a diisocyanate compound, a hydroxy acrylate compound, and a polyol, where the molar ratio of the diisocyanate compound to the hydroxy acrylate compound to the polyol in the reaction process is n:m:p. n, m, and p are referred to herein as mole numbers or molar proportions of diisocyanate, hydroxy acrylate, and polyol; respectively. The mole numbers n, m and p are positive integer or positive non-integer numbers. When p is 2.0, n is in the range from 3.0-5.0, or in the range from 3.0-4.5, or in the range from 3.2-4.8, or in the range from 3.4-4.6, or in the range from 3.6-4.4, and m is in the range from 1.50n-3 to 2.50n-5, or in the range from 1.55n-3 to 2.45n-5, or in the range from 1.60n-3 to 2.40n-5, or in the range from 1.65n-3 to 2.35n-5. For example, when p is 2.0 and n is 3.0, m is in the range from 1.5 to 2.5, or in the range from 1.65 to 2.35, or in the range from 1.80 to 2.20, or in the range from 1.95 to 2.05. For values of p other than 2.0, the molar ratio n:m:p scales proportionally. For example, the molar ratio n:m:p=4.0:3.0:2.0 is equivalent to the molar ratio n:m:p=2.0:1.5:1.0.

The mole number m may be selected to provide an amount of the hydroxy acrylate compound to stoichiometrically react with unreacted isocyanate groups present in the product composition formed from the reaction of diisocyanate compound and polyol used to form the oligomer. The isocyanate groups may be present in unreacted diisocyanate compound (unreacted starting material) or in isocyanate-terminated urethane compounds formed in reactions of the diisocyanate compound with the polyol. Alternatively, the mole number m may be selected to provide an amount of the hydroxy acrylate compound in excess of the amount needed to stoichiometrically react with any unreacted isocyanate groups present in the product composition formed from reaction of the diisocyanate compound and the polyol. The hydroxy acrylate compound is added as a single aliquot or multiple aliquots. In one embodiment, an initial aliquot of hydroxy acrylate is included in the reaction mixture used to form the oligomer and the product composition formed can be tested for the presence of unreacted isocyanate groups (e.g. using FTIR spectroscopy to detect the presence of isocyanate groups). Additional aliquots of hydroxy acrylate compound may be added to the product composition to stoichiometrically react with unreacted isocyanate groups (using, for example, FTIR spectroscopy to monitor a decrease in a characteristic isocyanate frequency (e.g. at 2260 cm$^{-1}$-2270 cm$^{-1}$) as isocyanate groups are converted by the hydroxy acrylate compound). In alternate embodiments, aliquots of hydroxy acrylate compound in excess of the amount needed to stoichiometrically react with unreacted isocyanate groups are added. As described more fully below, for a given value of p, the ratio of the mole number m to the mole number n influences the relative proportions of polyether urethane diacrylate compound and di-adduct compound in the oligomer and differences in the relative proportions of polyether urethane diacrylate compound and di-adduct compound lead to differences in the tear strength and/or critical stress of coatings formed from the oligomer.

In one embodiment, the oligomer is formed from a reaction mixture that includes 4,4'-methylene bis(cyclohexyl isocyanate), 2-hydroxyethyl acrylate, and polypropylene glycol in the molar ratios n:m:p as specified above, where the polypropylene glycol has a number average molecular weight in the range from 2500 g/mol-6500 g/mol, or in the range from 3000 g/mol-6000 g/mol, or in the range from 3500 g/mol-5500 g/mol.

The oligomer includes two or more compounds. One compound is a polyether urethane diacrylate compound having the molecular formula (IV):

(V) is the same as group $R_1$ in molecular formula (I), the group $R_2$ in molecular formula (IV) is the same as group $R_2$ in molecular formula (II), and the group $R_3$ in molecular formulas (IV) and (V) is the same as group $R_3$ in molecular formula (III). The di-adduct compound corresponds to the compound formed by reaction of both terminal isocyanate groups of the diisocyanate compound of molecular formula (I) with the hydroxy acrylate compound of molecular formula (III) where the diisocyanate compound has undergone no reaction with the polyol of molecular formula (II).

The di-adduct compound is formed from a reaction of the diisocyanate compound with the hydroxy acrylate compound during the reaction used to form the oligomer. Alternatively, the di-adduct compound is formed independent of the reaction used to form the oligomer and is added to the product of the reaction used to form the polyether urethane diacrylate compound or to a purified form of the polyether urethane diacrylate compound. The hydroxy group of the hydroxy acrylate compound reacts with an isocyanate group of the diisocyanate compound to provide a terminal acrylate group. The reaction occurs at each isocyanate group of the diisocyanate compound to form the di-adduct compound. The di-adduct compound is present in the oligomer in an amount of at least 1.0 wt %, or at least 1.5 wt %, or at least 2.0 wt %, or at least 2.25 wt %, or at least 2.5 wt %, or at least 3.0 wt %, or at least 3.5 wt %, or at least 4.0 wt %, or at least 4.5 wt %, or at least 5.0 wt %, or at least 7.0 wt % or at least 9.0 wt %, or in the range from 1.0 wt %-10.0 wt %, or in the range from 2.0 wt % to 9.0 wt %, or in the range from 2.5 wt %-6.0 wt %, or in the range from 3.0 wt %-8.0 wt %, or in the range from 3.0 wt % to 5.0 wt %, or in the range from 3.0 wt %-5.5 wt %, or in the range from 3.5 wt %-5.0 wt %, or in the range from 3.5 wt % to 7.0 wt %. It is noted that the concentration of diadduct is expressed in terms of wt % of the oligomer and not in terms of wt % in the coating composition.

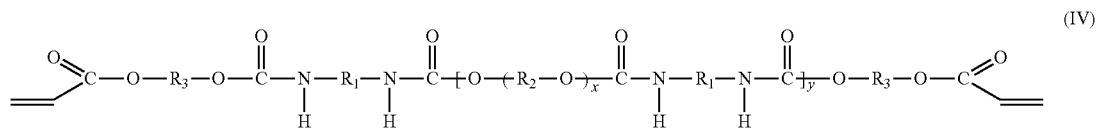

and the second compound is a di-adduct compound having the molecular formula (V):

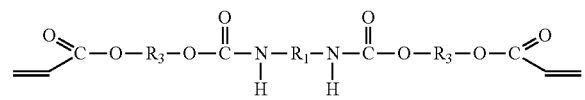

where the groups $R_1$, $R_2$, and $R_3$ and the integer x are as described hereinabove, y is a positive integer, and it is understood that the group $R_1$ in molecular formulas (IV) and An illustrative reaction for synthesizing an oligomer in accordance with the present disclosure includes reaction of a diisocyanate compound (4,4'-methylene bis(cyclohexyl isocyanate, which is also referred to herein as H12MDI) and a polyol (polypropylene glycol with $M_n$~4000 g/mol, which is also referred to herein as PPG4000) to form a polyether urethane isocyanate compound with formula (VI):

H12MDI~PPG4000~H12MDI~PPG4000~H12MDI (VI)

where "~" denotes a urethane linkage formed by the reaction of a terminal isocyanate group of H12MDI with a terminal alcohol group of PPG4000 and ~H12MDI, ~H12MDI~, and PPG4000~ refer to residues of H12MDI and PPG4000 remaining after the reaction. The polyether urethane isocyanate compound has a repeat unit of the type ~(H12MDI~PPG4000)~. The particular polyether urethane isocyanate shown includes two PPG4000 units. The reaction may also provide products having one PPG4000 unit, or three or more PPG4000 units. The polyether urethane isocyanate and any unreacted H12MDI include terminal isocyanate groups. In accordance with the present disclosure, a hydroxy acrylate compound (such as 2-hydroxyethyl acrylate, which is referred to herein as HEA) is included in the reaction to react with terminal isocyanate groups to convert them to terminal acrylate groups. The conversion of terminal isocyanate groups to terminal acrylate groups effects a quenching of the isocyanate group. The amount of HEA included in the reaction may be an amount estimated to react stoichiometrically with the expected concentration of unreacted isocyanate groups or an amount in excess of the expected stoichiometric amount. Reaction of HEA with the polyether urethane isocyanate compound forms the polyether urethane acrylate compound with formula (VII):

HEA~H12MDI~PPG4000~H12MDI~PPG4000~H12MDI (VII)

and/or the polyether urethane diacrylate compound with formula (VIII):

HEA~H12MDI~PPG4000~H12MDI~PPG4000~H12MDI~HEA (VIII)

and reaction of HEA with unreacted H12MDI forms the di-adduct compound with formula (IX):

HEA~H12MDI~HEA (IX)

where, as above, ~ designates a urethane linkage and ~HEA designates the residue of HEA remaining after reaction to form the urethane linkage (consistent with formulas (IV) and (V)). The combination of a polyether urethane diacrylate compound and a di-adduct compound in the product composition constitutes an oligomer in accordance with the present disclosure. As described more fully hereinbelow, when one or more oligomers are used in coating compositions, coatings having improved tear strength and critical stress characteristics result. In particular, it is demonstrated that oligomers having a high proportion of di-adduct compound provide coatings with high tear strengths and/or high critical stress values.

Although depicted for the illustrative combination of H12MDI, HEA and PPG4000, the foregoing reaction may be generalized to an arbitrary combination of a diisocyanate compound, a hydroxy acrylate compound, and a polyol, where the hydroxy acrylate compound reacts with terminal isocyanate groups to form terminal acrylate groups and where urethane linkages form from reactions of isocyanate groups and alcohol groups of the polyol or hydroxy acrylate compound.

The oligomer includes a compound that is a polyether urethane diacrylate compound with formula (X):

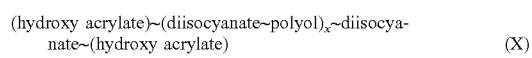
(hydroxy acrylate)~(diisocyanate~polyol)$_x$~diisocyanate~(hydroxy acrylate) (X)

and a compound that is a di-adduct compound with formula (XI):

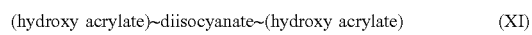
(hydroxy acrylate)~diisocyanate~(hydroxy acrylate) (XI)

where the relative proportions of diisocyanate compound, hydroxy acrylate compound, and polyol used in the reaction to form the oligomer correspond to the mole numbers n, m, and p disclosed hereinabove.

Compounds represented by molecular formulas (I) and (II) above, for example, react to form a polyether urethane isocyanate compound represented by molecular formula (XII):

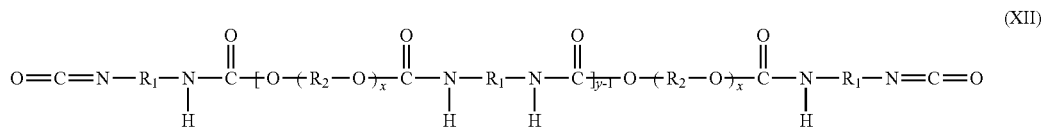

where y is the same as y in formula (IV) and is 1, or 2, or 3 or 4 or higher; and x is determined by the number of repeat units of the polyol (as described hereinabove).

Further reaction of the polyether urethane isocyanate of molecular formula (XII) with the hydroxy acrylate of molecular formula (III) provides the polyether urethane diacrylate compound represented by molecular formula (IV) referred to hereinabove and repeated below:

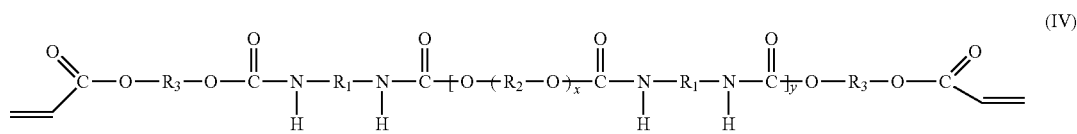

where y is 1, or 2, or 3, or 4 or higher; and x is determined by the number of repeat units of the polyol (as described hereinabove).

In an embodiment, the reaction between the diisocyanate compound, hydroxy acrylate compound, and polyol yields a series of polyether urethane diacrylate compounds that differ in y such that the average value of y over the distribution of compounds present in the final reaction mixture is a non-integer. In an embodiment, the average value of y in the polyether urethane isocyanates and polyether urethane diacrylates of molecular formulas (XII) and (IV) corresponds to p or p−1 (where p is as defined hereinabove). In an embodiment, the average number of occurrences of the group $R_1$ in the polyether urethane isocyanates and polyether urethane diacrylates of the molecular formulas (XII) and (IV) correspond to n (where n is as defined hereinabove).

The relative proportions of the polyether urethane diacrylate and di-adduct compounds produced in the reaction are controlled by varying the molar ratio of the mole numbers n, m, and p. By way of illustration, the case where p=2.0 is considered. In the theoretical limit of complete reaction, two equivalents p of polyol would react with three equivalents n of a diisocyanate to form a compound having molecular formula (XII) in which y=2. The compound includes two terminal isocyanate groups, which can be quenched with subsequent addition of two equivalents m of a hydroxy acrylate compound in the theoretical limit to form the corresponding polyether urethane diacrylate compound (IV) with y=2. A theoretical molar ratio n:m:p=3.0:2.0:2.0 is defined for this situation.

In the foregoing exemplary theoretical limit, a reaction of diisocyanate, hydroxy acrylate, and polyol in the theoretical molar ratio n:m:p=3.0:2.0:2.0 provides a polyether urethane diacrylate compound having molecular formula (IV) in which y=2 without forming a di-adduct compound. Variations in the mole numbers n, m, and p provide control over the relative proportions of polyether urethane diacrylate and di-adduct formed in the reaction. Increasing the mole number n relative to the mole number m or the mole number p, for example, may increase the amount of di-adduct compound formed in the reaction. Reaction of the diisocyanate compound, the hydroxy acrylate compound, and polyol compound in molar ratios n:m:p, where n>3.0, such as where n is between 3.0 and 4.5, m is between 1.5n−3 and 2.5n−5, and p is 2.0, for example, produce amounts of the di-adduct compound in the oligomer sufficient to achieve the beneficial coating properties described hereinbelow.

Variations in the relative proportions of di-adduct and polyether urethane diacrylate are obtained through changes in the mole numbers n, m, and p and through such variations, it is possible to precisely control the tear strength, tensile toughness, and other mechanical properties of coatings formed from coating compositions that include the oligomer. In one embodiment, control over properties is achievable by varying the number of units of polyol in the polyether urethane diacrylate compound (e.g. p=2.0 vs. p=3.0 vs. p=4.0). In another embodiment, control of tear strength, tensile toughness, and other mechanical properties is achieved by varying the proportions polyether urethane diacrylate compound and di-adduct compound. For a polyether urethane compound with a given number of polyol units, oligomers having variable proportions of di-adduct compound can be prepared. The variability in proportion of di-adduct compound can be finely controlled to provide oligomers based on a polyether urethane compound with a fixed number of polyol units that provide coatings that offer precise or targeted values of tear strength, tensile toughness, or other mechanical properties.

Improved fiber coatings result when utilizing a coating composition that incorporates an oligomer that includes a polyether urethane diacrylate compound represented by molecular formula (IV) and a di-adduct compound represented by molecular formula (V), where concentration of the di-adduct compound in the oligomer is at least 1.0 wt %, or at least 1.5 wt %, or at least 2.0 wt %, or at least 2.25 wt %, or at least 2.5 wt %, or at least 3.0 wt %, or at least 3.5 wt %, or at least 4.0 wt %, or at least 4.5 wt %, or at least 5.0 wt %, or at least 7.0 wt % or at least 9.0 wt %, or in the range from 1.0 wt %-10.0 wt %, or in the range from 2.0 wt % to 9.0 wt %, or in the range from 3.0 wt % to 8.0 wt %, or in the range from 3.5 wt % to 7.0 wt % or in the range from 2.5 wt % to 6.0 wt %, or in the range from 3.0 wt % to 5.5 wt %, or in the range from 3.5 wt % to 5.0 wt %. It is noted that the concentration of diadduct is expressed in terms of wt % of the oligomer and not in terms of wt % in the coating composition. The concentration of the di-adduct compound is increased in one embodiment by varying the molar ratio n:m:p of diisocyanate:hydroxy acrylate:polyol. In one aspect, molar ratios n:m:p that are rich in diisocyanate relative to polyol promote the formation of the di-adduct compound.

In the exemplary stoichiometric ratio n:m:p=3:2:2 described hereinabove, the reaction proceeds with p equivalents of polyol, n=p+1 equivalents of diisocyanate, and two equivalents of hydroxy acrylate. If the mole number n exceeds p+1, the diisocyanate compound is present in excess relative to the amount of polyol compound needed to form the polyether urethane diacrylate of molecular formula (IV). The presence of excess diisocyanate shifts the distribution of reaction products toward enhanced formation of the di-adduct compound.

To promote formation of the di-adduct compound from excess diisocyanate compound, the amount of hydroxy acrylate can also be increased. For each equivalent of diisocyanate above the stoichiometric mole number n=p+1, two equivalents of hydroxy acrylate are needed to form the di-adduct compound. In the case of arbitrary mole number p (polyol), the stoichiometric mole numbers n (diisocyanate) and m (hydroxy acrylate) are p+1 and 2, respectively. As the mole number n is increased above the stoichiometric value, the equivalents of hydroxy acrylate needed for complete reaction of excess diisocyanate to form the di-adduct compound may be expressed as m=2+2[n−(p+1)], where the leading term "2" represents the equivalents of hydroxy acrylate needed to terminate the polyether urethane diacrylate compound (compound having molecular formula (V)) and the term 2[n−(p+1)] represents the equivalents of hydroxy acrylate needed to convert the excess starting diisocyanate to the di-adduct compound. If the actual value of the mole number m is less than this number of equivalents, the available hydroxy acrylate reacts with isocyanate groups present on the oligomer or free diisocyanate molecules to form terminal acrylate groups. The relative kinetics of the two reaction pathways dictates the relative amounts of polyether urethane diacrylate and di-adduct compounds formed and the deficit in hydroxy acrylate relative to the amount required to quench all unreacted isocyanate groups may be controlled to further influence the relative proportions of polyether urethane diacrylate and di-adduct formed in the reaction.

In some embodiments, the reaction to form the oligomer includes heating the reaction composition formed from the diisocyanate compound, hydroxy acrylate compound, and polyol. The heating facilitates conversion of terminal isocyanate groups to terminal acrylate groups through a reaction of the hydroxy acrylate compound with terminal isocyanate groups. In different embodiments, the hydroxy acrylate compound is present in excess in the initial reaction mixture and/or is otherwise available or added in unreacted form to effect conversion of terminal isocyanate groups to terminal acrylate groups. The heating occurs at a temperature above 40° C. for at least 12 hours, or at a temperature above 40° C. for at least 18 hours, or at a temperature above 40° C. for at least 24 hours, or at a temperature above 50° C. for at least 12 hours, or at a temperature above 50° C. for at least 18 hours, or at a temperature above 50° C. for at least 24 hours, or at a temperature above 60° C. for at least 12 hours, or at a temperature above 60° C. for at least 18 hours, or at a temperature above 60° C. for at least 24 hours.

In an embodiment, conversion of terminal isocyanate groups on the polyether urethane diacrylate compound or starting diisocyanate compound (unreacted initial amount or amount present in excess) to terminal acrylate groups is facilitated by the addition of a supplemental amount of hydroxy acrylate compound to the reaction mixture. As indicated hereinabove, the amount of hydroxy acrylate compound needed to quench (neutralize) terminal isocyanate groups may deviate from the theoretical number of equivalents due, for example, to incomplete reaction or a desire to control the relative proportions of polyether urethane diacrylate compound and di-adduct compound. As described hereinabove, once the reaction has proceeded to completion or other endpoint, it is preferable to quench (neutralize) residual isocyanate groups to provide a stabilized reaction product. In an embodiment, supplemental hydroxy acrylate is added to accomplish this objective.

In an embodiment, the amount of supplemental hydroxy acrylate compound is in addition to the amount included in the initial reaction process. The presence of terminal isocyanate groups at any stage of the reaction is monitored, for example, by FTIR spectroscopy (e.g. using a characteristic isocyanate stretching mode near 2265 cm$^{-1}$) and supplemental hydroxy acrylate compound is added as needed until the intensity of the characteristic stretching mode of isocyanate groups is negligible or below a pre-determined threshold. In an embodiment, supplemental hydroxy acrylate compound is added beyond the amount needed to fully convert terminal isocyanate groups to terminal acrylate groups. In different embodiments, supplemental hydroxy acrylate compound is included in the initial reaction mixture (as an amount above the theoretical amount expected from the molar amounts of diisocyanate and polyol), added as the reaction progresses, and/or added after reaction of the diisocyanate and polyol compounds has occurred to completion or pre-determined extent.

The oligomer of the coating composition includes a polyether urethane diacrylate compound and di-adduct compound as described hereinabove. In some aspects, the oligomer includes two or more polyether urethane diacrylate compounds and/or two or more di-adduct compounds. The oligomer content of the coating composition includes the combined amounts of the one or more polyether urethane diacrylate compound(s) and one or more di-adduct compound(s) and is greater than 20 wt %, or greater than 30 wt %, or greater than 40 wt %, or in the range from 20 wt %-80 wt %, or in the range from 30 wt %-70 wt %, or in the range from 40 wt %-60 wt %, where the concentration of di-adduct compound within the oligomer content is as described above.

The curable coating composition further includes one or more monomers. The one or more monomers is/are selected to be compatible with the oligomer, to control the viscosity of the coating composition to facilitate processing, and/or to influence the physical or chemical properties of the coating formed as the cured product of the coating composition. The monomers include ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof.

Representative radiation-curable ethylenically unsaturated monomers include alkoxylated monomers with one or more acrylate or methacrylate groups. An alkoxylated monomer is one that includes one or more alkoxylene groups, where an alkoxylene group has the form —O—R— and R is a linear or branched alkylene group. Examples of alkoxylene groups include ethoxylene (—O—CH$_2$—CH$_2$—), n-propoxylene (—O—CH$_2$—CH$_2$—CH$_2$—), isopropoxylene (—O—CH$_2$—CH(CH$_3$)—, or —O—CH(CH$_3$)—CH$_2$—), etc. As used herein, the degree of alkoxylation refers to the number of alkoxylene groups in the monomer. In one embodiment, the alkoxylene groups are bonded consecutively in the monomer.

In some embodiments, the monomer component of the coating composition includes an alkoxylated compound having the general formula (XIII)

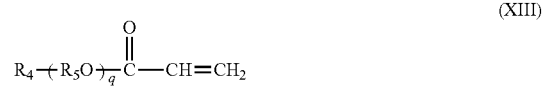

(XIII)

where R$_4$ is an organic group, R$_{50}$ is an alkoxylene group, and q is in the range from 1-10, or in the range from 1-6, or in the range from 1-4, or in the range from 1-3, or in the range from 2-8, or in the range from 2-6, or 1, or 2, or 3. In one embodiment, R$_4$ is a linear or branched alkyl group that optionally also includes oxygen (e.g. alkoxy group, such as methoxy, or ethoxy, or propoxy) and R$_5$ is a linear or branched alkylene group. R$_4$ preferably includes an aromatic group substituted with an alkyl group. More preferably, R$_4$ includes a substituted phenol group shown by formula (XIV),

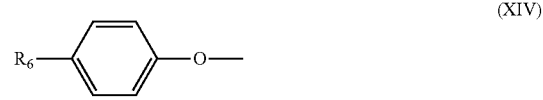

(XIV)

where R$_6$ is preferably an alkyl group having 4-20 carbon atoms, or 5-15 carbon atoms, or 6-12 carbon atoms, or 7-10 carbon atoms. When R$_6$ is an alkyl group, the group depicted by formula (XIV) is referred to as an alkylphenol group. A particularly preferred group R$_6$ is the nonyl group (C$_9$H$_{19}$), in which case R$_4$ is a nonylphenol group. R$_5$ is preferably an alkylene group with more than two carbon atoms including alkylene groups with three carbon atoms, or four carbon atoms, or five carbon atoms, or a number of carbon atoms in the range from 3-6, or a number of carbon atoms in the range from 3-5.

R$_5$O is preferably an isopropoxylene group, where R$_5$ is the isopropylene group of formula (XV) or formula (XVI):

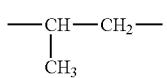

(XV)

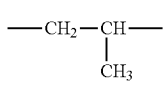

(XVI)

The group of formula (XV) is also written herein as —CH(CH$_3$)CH$_2$— and the group of formula (XVI) is also written herein as —CH$_2$CH(CH$_3$)—. When q is greater than 1, a monomer containing an isopropoxylene group includes only isopropylene groups of formula (XV), only isopropylene groups of formula (XVI), or a combination of isopropylene groups of formula (XV) and isopropylene groups of formula (XVI). More generally, when the group R$_5$ has isomeric forms, the monomer can include any one isomeric form alone or any combination of two or more isomeric forms. Similarly, when the group R$_4$ or R$_6$ has isomeric forms, the monomer may include any one isomeric form alone or any combination of two or more isomeric forms of R$_4$ and/or R$_6$.

Preferred monomers include alkylphenol acrylate monomers having the formula (XVII)

$$R_6 \!-\!\!\bigcirc\!\!-\!O\!-\!(R_5O)_{\overline{q}}\!-\!\overset{O}{\overset{\|}{C}}\!-\!CH\!=\!CH_2 \qquad (XVII)$$

where R$_6$, R$_5$, and q are as described above. In other embodiments, the monomer is an alkylphenol methacrylate monomer.

The concentration of alkoxylated monomer with the formula (XIII) in the coating composition is greater than 15 wt %, or greater than 25 wt %, or greater than 35 wt %, or greater than 45 wt %, or greater than 55 wt %, or in the range from 15 wt %-75 wt %, or in the range from 25 wt %-70 wt %, or in the range from 30 wt %-65 wt %, or in the range from 35 wt %-60 wt %.

In some aspects, the coating composition includes an alkoxylated monomer with the formula (XIII) and one or more additional monofunctional and/or multifunctional monomers.

In some aspects, the coating composition includes an alkoxylated monomer of the form R$_4$—(R$_5$O)$_q$—C(O)CH=CH$_2$ described above and a monofunctional ethylenically unsaturated monomer. Monofunctional ethylenically unsaturated monomers include monofunctional acrylate monomers and monofunctional methacrylate monomers such as lauryl acrylate (e.g., SR335 available from Sartomer Company, Inc., AGEFLEX FA12 available from BASF, and PHOTOMER 4812 available from IGM Resins), ethoxylated nonylphenol acrylate (e.g., SR504 available from Sartomer Company, Inc. and PHOTOMER 4066 available from IGM Resins), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from BASF, and PHOTOMER 4035 available from IGM Resins), isooctyl acrylate (e.g., SR440 available from Sartomer Company, Inc. and AGEFLEX FA8 available from BASF), tridecyl acrylate (e.g., SR489 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and AGEFLEX FA10 available from BASF), 2-(2-ethoxyethoxy)ethyl acrylate (e.g., SR256 available from Sartomer Company, Inc.), epoxy acrylate (e.g., CN120, available from Sartomer Company, and EBECRYL 3201 and 3604, available from Cytec Industries Inc.), lauryloxyglycidyl acrylate (e.g., CN130 available from Sartomer Company), phenoxyglycidyl acrylate (e.g., CN131 available from Sartomer Company), methacrylate analogs of the foregoing, and combinations thereof.

In some aspects, the coating composition includes an alkoxylated monomer with the form (XIII) and a multifunctional ethylenically unsaturated monomer. Multifunctional ethylenically unsaturated monomers include multifunctional acrylate monomers and multifunctional methacrylate monomers. Multifunctional acrylates are acrylates having two or more polymerizable acrylate moieties per molecule, or three or more polymerizable acrylate moieties per molecule. Examples of multifunctional acrylates include dipentaerythritol monohydroxy pentaacrylate (e.g., PHOTOMER 4399 available from IGM Resins); methylolpropane polyacrylates with and without alkoxylation such as trimethylolpropane triacrylate, ditrimethylolpropane tetraacrylate (e.g., PHOTOMER 4355, IGM Resins); alkoxylated glyceryl triacrylates such as propoxylated glyceryl triacrylate with propoxylation being 3 or greater (e.g., PHOTOMER 4096, IGM Resins); and erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), dipentaerythritol pentaacrylate (e.g., PHOTOMER 4399, IGM Resins, and SR399, Sartomer Company, Inc.), tripropyleneglycol diacrylate, propoxylated hexanediol diacrylate, tetrapropyleneglycol diacrylate, pentapropyleneglycol diacrylate, methacrylate analogs of the foregoing, and combinations thereof.

In some aspects, the coating composition includes an alkoxylated monomer with the formula (XIII) and an N-vinyl amide monomer such as an N-vinyl lactam, or N-vinyl pyrrolidinone, or N-vinyl caprolactam, where the N-vinyl amide monomer is present in the coating composition at a concentration greater than 1.0 wt %, or greater than 2.0 wt %, or greater than 3.0 wt %, or in the range from 1.0 wt %-15.0 wt %, or in the range from 2.0 wt %-10.0 wt %, or in the range from 3.0 wt %-8.0 wt %.

In some aspects, the coating composition includes an alkoxylated monomer with the formula (XIII), a monofunctional acrylate monomer as described above, and an N-vinyl amide monomer.

In one aspect, the coating composition includes an oligomer as described herein, an alkoxylated monomer with the formula (XIII) and a monofunctional acrylate monomer as described herein, where the concentration of the oligomer is in the range from 20 wt %-80 wt %, or in the range from 30 wt %-70 wt %, or in the range from 40 wt %-60 wt %; and the concentration of alkoxylated monomer is greater than 15 wt %, or greater than 25 wt %, or greater than 35 wt %, or greater than 45 wt %, or greater than 55 wt %, or in the range from 15 wt %-75 wt %, or in the range from 25 wt %-70 wt %, or in the range from 30 wt %-65 wt %, or in the range from 35 wt %-60 wt %.

In one aspect, the coating composition includes an oligomer as described herein, an alkoxylated monomer of the formula (XIII), a monofunctional acrylate monomer as described herein, and an N-vinyl amide monomer, where the concentration of the oligomer is in the range from 20 wt %-80 wt %, or in the range from 30 wt %-70 wt %, or in the range from 40 wt %-60 wt %; and the concentration of alkoxylated monomer is greater than 15 wt %, or greater than 25 wt %, or greater than 35 wt %, or greater than 45 wt %, or greater than 55 wt %, or in the range from 15 wt %-75 wt %, or in the range from 25 wt %-70 wt %, or in the range from 30 wt %-65 wt %, or in the range from 35 wt %-60 wt %; and the N-vinyl amide monomer is present in the coating composition at a concentration greater than 1.0 wt %, or greater than 2.0 wt %, or greater than 3.0 wt %, or in the range from 1.0 wt %-15.0 wt %, or in the range from 2.0 wt %-10.0 wt %, or in the range from 3.0 wt %-8.0 wt %.

In some embodiments, the coating composition may also include one or more polymerization initiators and one or more additives.

The polymerization initiator facilitates initiation of the polymerization process associated with the curing of the coating composition to form the coating. Polymerization initiators include thermal initiators, chemical initiators, electron beam initiators, and photoinitiators. Photoinitiators are preferred polymerization initiators. Photoinitiators include ketonic photoinitiating additives and/or phosphine oxide additives. When used in the formation reaction of the coating of the present disclosure, the photoinitiator is present in an amount sufficient to enable rapid radiation curing. The wavelength of curing radiation is infrared, visible, or ultraviolet. Representative wavelengths include wavelengths in the range from 300 nm-1000 nm, or in the range from 300 nm-700 nm, or in the range from 300 nm-400 nm, or in the range from 325 nm-450 nm, or in the range from 325 nm-400 nm, or in the range from 350 nm-400 nm. Curing can be accomplished with a lamp source (e.g. Hg lamp) or LED source (e.g. a UVLED, visible LED, or infrared LED).

Representative photoinitiators include 1-hydroxycyclohexylphenyl ketone (e.g., IRGACURE 184 available from BASF)); bis(2,6-dimethoxybenzoyl)-2,4,4-trimethylpentylphosphine oxide (e.g., commercial blends IRGACURE 1800, 1850, and 1700 available from BASF); 2,2-dimethoxy-2-phenylacetophenone (e.g., IRGACURE 651, available from BASF); bis(2,4,6-trimethylbenzoyl)-phenylphosphine oxide (IRGACURE 819); (2,4,6-trimethylbenzoyl) diphenyl phosphine oxide (LUCIRIN TPO, available from BASF (Munich, Germany)); ethoxy(2,4,6-trimethylbenzoyl)-phenylphosphine oxide (LUCIRIN TPO-L from BASF); and combinations thereof.

The coating composition includes a single photoinitiator or a combination of two or more photoinitiators. The total photoinitiator concentration in the coating composition is greater than 0.25 wt %, or greater than 0.50 wt %, or greater than 0.75 wt %, or greater than 1.0 wt %, or in the range from 0.25 wt %-5.0 wt %, or in the range from 0.50 wt %-4.0 wt %, or in the range from 0.75 wt %-3.0 wt %.

In addition to oligomer(s), monomer(s), and polymerization initiator(s), the coating composition optionally includes one or more additives. Additives include an adhesion promoter, a strength additive, an antioxidant, a catalyst, a stabilizer, an optical brightener, a property-enhancing additive, an amine synergist, a wax, a lubricant, and/or a slip agent. Some additives operate to control the polymerization process, thereby affecting the physical properties (e.g., modulus, glass transition temperature) of the polymerization product formed from the coating composition. Other additives affect the integrity of the cured product of the coating composition (e.g., protect against de-polymerization or oxidative degradation).

An adhesion promoter is a compound that facilitates adhesion of the primary coating and/or primary composition to glass (e.g. the cladding portion of a glass fiber). Suitable adhesion promoters include alkoxysilanes, mercapto-functional silanes, organotitanates, and zirconates. Representative adhesion promoters include mercaptoalkyl silanes or mercaptoalkoxy silanes such as 3-mercaptopropyl-trialkoxysilane (e.g., 3-mercaptopropyl-trimethoxysilane, available from Gelest (Tullytown, Pa.)); bis(trialkoxysilyl-ethyl)benzene; acryloxypropyltrialkoxysilane (e.g., (3-acryloxypropyl)-trimethoxysilane, available from Gelest), methacryloxypropyltrialkoxysilane, vinyltrialkoxysilane, bis(trialkoxysilylethyl)hexane, allyltrialkoxysilane, styrylethyltrialkoxysilane, and bis(trimethoxysilylethyl) benzene (available from United Chemical Technologies (Bristol, Pa.)); see U.S. Pat. No. 6,316,516, the disclosure of which is hereby incorporated by reference in its entirety herein.

The adhesion promoter is present in the coating composition in an amount between 0.02 pph and 10.0 pph, or between 0.05 pph and 4.0 pph, or between 0.1 pph and 4.0 pph, or between 0.1 pph and 3.0 pph, or between 0.1 pph and 2.0 pph, or between 0.1 pph and 1.0 pph, or between 0.5 pph and 4.0 pph, or between 0.5 pph and 3.0 pph, or between 0.5 pph and 2.0 pph, or between 0.5 pph to 1.0 pph.

A representative antioxidant is thiodiethylene bis[3-(3,5-di-tert-butyl)-4-hydroxy-phenyl) propionate] (e.g., IRGANOX 1035, available from BASF). In some aspects, an antioxidant is present in the coating composition in an amount greater than 0.25 pph, or greater than 0.50 pph, or greater than 0.75 pph, or greater than 1.0 pph, or an amount in the range from 0.25 pph-3.0 pph, or an amount in the range from 0.50 pph-2.0 pph, or an amount in the range from 0.75 pph-1.5 pph.

Representative optical brighteners include TINOPAL OB (available from BASF); Blankophor KLA (available from Bayer); bisbenzoxazole compounds; phenylcoumarin compounds; and bis(styryl)biphenyl compounds. In an embodiment, the optical brightener is present in the coating composition at a concentration of 0.005 pph-0.3 pph.

Representative amine synergists include triethanolamine; 1,4-diazabicyclo[2.2.2]octane (DABCO), triethylamine, and methyldiethanolamine. In an embodiment, an amine synergist is present at a concentration of 0.02 pph-0.5 pph.

Curing of the coating compositions described herein provide a cured product, such as a coating, with increased resistance to defect formation during manufacturing or subsequent processing or handling. As described in greater detail hereinbelow, the present disclosure demonstrates that coatings having high tear strength and/or high tensile toughness are more resistant to defect initiation and propagation during fiber processing and handling. The coating compositions further exhibit high cure speed and low Young's modulus. Although coatings with high tear strength and/or high tensile toughness have been described in the prior art, such coatings also exhibit a high Young's modulus and fail to provide the superior microbending performance of the present coatings when used as coatings for optical fibers. The coatings of the prior art also exhibit slow cure speeds. The cured products of coating compositions described herein combine a low Young's modulus with high tear strength and/or high tensile toughness and/or fast cure speed and thus provide coatings with desirable performance attributes for primary coatings for optical fibers.

In a continuous optical fiber manufacturing process, a glass fiber is drawn from a heated preform and sized to a target diameter (typically 125 µm). The glass fiber is then cooled and directed to a coating system that applies a liquid primary coating composition to the glass fiber. Two process options are viable after application of the liquid primary coating composition to the glass fiber. In one process option (wet-on-dry process), the liquid primary coating composition is cured to form a solidified primary coating, the liquid secondary coating composition to the primary coating, and the liquid secondary coating composition is cured to form a solidified secondary coating. In a second process option (wet-on-wet process), the liquid secondary coating composition is applied to the liquid primary coating composition, and both liquid coating compositions are cured simultaneously to provide solidified primary and secondary coatings. To improve process efficiency, it is desirable to increase the draw speed of the fiber. As the draw speed increases, however, the cure speed of coating compositions must increase. The coating compositions disclosed herein are compatible with fiber draw processes that operate at a draw speed greater than 35 m/s, or greater than 40 m/s, or greater than 45 m/s, or greater than 50 m/s, or greater than 55 m/s.

EXAMPLES

The following examples illustrate formulation, curing and properties of coating compositions in accordance with the present disclosure and comparative coating compositions. The coating compositions include an oligomer, two monofunctional monomers, a photoinitiator, an adhesion promoter, an antioxidant, and a strength additive. The components of the coating compositions and the concentration of each component are summarized in Table 1. Six coating compositions (A-F) were prepared. Coating composition A is a comparative composition.

from Miwon) and has the structure given by formula (X) in which $R_6$ is $C_9H_{19}$—, $R_5$ is a random mixture of —CH(CH$_3$)CH$_2$— and —CH$_2$CH(CH$_3$)—, and q=2. Methoxytripropyleneglycol acrylate is CH$_3$O—(CH$_2$CH(CH$_3$)O)$_3$—C(O)CH=CH$_2$ (Photomer 8061, available from IGM). NVC is N-vinyl caprolactam (available from Aldrich). TPO is 2,4,6-trimethylbenzoyl)diphenyl phosphine oxide (a photoinitiator, available from BASF). Irganox 1035 is thiodiethylene bis[3-(3,5-di-tert-butyl)-4-hydroxy-phenyl) propionate] (an antioxidant, available from BASF). Tetrathiol is pentaerythritoltetrakis(3-mercaptopropionate) (available from Aldrich) and functions as a quencher of residual dibutyltin dilaurate catalyst that may be present in the oligomer.

Oligomer Synthesis.

The same oligomer was used for each of the coating compositions listed in Table 1. The oligomer was prepared from H12MDI (4,4'-methylene bis(cyclohexyl isocyanate), PPG4000 (polypropylene glycol with $M_n$~4000 g/mol) and HEA (2-hydroxyethyl acrylate) in accordance with the reaction scheme described hereinabove (see formulas (I)-(XII)). The oligomer included a polyether urethane diacrylate compound of the type shown in formula (IV or VIII) and a di-adduct compound of the type shown in formula (V or IX). All reagents were used as supplied by the manufacturer and were not subjected to further purification. H12MDI was obtained from Aldrich. PPG4000 was obtained from Covestro. HEA was obtained from Kowa. In the preparation, 27.8 g of H12MDI, 12.3 g of HEA, and 209.9 g of PPG4000 were used. The molar ratio n:m:p was 4:4:2, where n refers to the relative molar amount of H12MDI, m refers to the relative molar amount of HEA, and p refers to the relative molar amount of PPG4000.

The oligomer was prepared by mixing the H12MDI (4,4'-methylene bis(cyclohexyl isocyanate)) with dibutyltin dilaurate (a catalyst) and 2,6-di-tert-butyl-4 methylphenol at room temperature in a 500 mL flask. The 500 mL flask was equipped with a thermometer, a CaCl$_2$) drying tube, and a stirrer. While continuously stirring the contents of the flask,

TABLE 1

| Coating Formulations | | | | | | |
|---|---|---|---|---|---|---|
| | A | B | C | D | E | F |
| Oligomer (wt %) | 50.0 | 50.0 | 50.0 | 50.0 | 50.0 | 50.0 |
| Nonylphenol(EO)$_4$ acrylate (wt %) | 46.5 | 45.0 | — | — | — | — |
| NVC (wt %) | 2.0 | 2.0 | 2.0 | 5.0 | 2.0 | 2.0 |
| TPO (wt %) | 1.5 | 3.0 | 1.5 | 1.5 | 1.5 | 1.5 |
| Nonylphenol(PO)$_4$ acrylate (wt %) | — | — | — | — | 46.5 | — |
| Nonylphenol(PO)$_2$ acrylate (wt %) | — | — | 46.5 | 43.5 | — | — |
| Methoxytripropyleneglycol acrylate (wt %) | — | — | — | — | — | 46.5 |
| 3-mercaptopropyltrimethoxysilane (wt %) | 0.8 | 0.8 | 0.8 | 0.8 | 0.8 | 0.8 |
| Irganox 1035 (wt %) | 1.0 | 1.0 | 1.0 | 1.0 | 1.0 | 1.0 |
| Tetrathiol (wt %) | 0.032 | 0.032 | 0.032 | 0.032 | 0.032 | 0.032 |

The same oligomer was used in each of the coating compositions listed in Table 1. The preparation and formula of the oligomer is described below. Nonylphenol(EO)$_4$ acrylate is ethoxylated(4)nonylphenol acrylate (SR504, available from Sartomer) and has the structure given by formula (X) in which $R_6$ is $C_9H_{19}$—, $R_5$ is —CH$_2$CH$_2$— and q is 4. Nonylphenol(PO)$_4$ acrylate is propoxylated(4)nonylphenol acrylate (PHOTOMER 4960, available from Cognis) and has the structure given by formula (X) in which $R_6$ is $C_9H_{19}$—, $R_5$ is a random mixture of —CH(CH$_3$)CH$_2$— and —CH$_2$CH(CH$_3$)—, and q=4. Nonylphenol(PO)$_2$ acrylate is propoxylated(2)nonylphenol acrylate (M1602, available the PPG4000 was added over a time period of 30-40 minutes using an addition funnel. The internal temperature of the reaction mixture was monitored as the PPG4000 was added and the introduction of PPG4000 was controlled to prevent excess heating (arising from the exothermic nature of the reaction). After the PPG4000 was added, the reaction mixture was heated in an oil bath at about 70° C.-75° C. for about 1-1½ hours. At various intervals, samples of the reaction mixture were retrieved for analysis by infrared spectroscopy (FTIR) to monitor the progress of the reaction by determining the concentration of unreacted isocyanate groups. The concentration of unreacted isocyanate groups was assessed based on the intensity of a characteristic isocyanate stretching mode near 2265 cm$^{-1}$. The flask was removed from the oil bath and its contents were allowed to cool to below 65° C. Addition of supplemental HEA was conducted to insure complete quenching of isocyanate groups. The supplemental HEA was added dropwise over 2-5 minutes using an addition funnel. After addition of the supplemental HEA, the flask was returned to the oil bath and its contents were again heated to about 70° C.-75° C. for about 1-1½ hours. FTIR analysis was conducted on the reaction mixture to assess the presence of isocyanate groups and the process was repeated until enough supplemental HEA was added to fully react any unreacted isocyanate groups. The reaction was deemed complete when no appreciable isocyanate stretching intensity was detected in the FTIR measurement.

The concentration (wt %) of di-adduct compound in the oligomer was determined by gel permeation chromatography (GPC). A Waters Alliance 2690 GPC instrument was used to determine the di-adduct concentration. The mobile phase was THF. The instrument included a series of three Polymer Labs columns. Each column had a length of 300 mm and an inside diameter of 7.5 mm. Two of the columns (columns 1 and 2) were sold under Part No. PL1110-6504 by Agilent Technologies and were packed with PLgel Mixed D stationary phase (polystyrene divinyl benzene copolymer, average particle size=5 μm, specified molecular weight range=200-400,000 g/mol). The third column (column 3) was sold under Part No. PL1110-6520 by Agilent Technologies and was packed with PLgel 100A stationary phase (polystyrene divinyl benzene copolymer, average particle size=5 μm, specified molecular weight range=up to 4,000 g/mol). The columns were calibrated with polystyrene standards ranging from 162-6,980,000 g/mol using EasiCal PS-1 & 2 polymer calibrant kits (Agilent Technologies Part Nos. PL2010-505 and PL2010-0601). The GPC instrument was operated under the following conditions: flow rate=1.0 mL/min, column temperature=40° C., injection volume=100 μL, and run time=35 min (isocratic conditions). The detector was a Waters Alliance 2410 differential refractometer operated at 40° C. and sensitivity level 4. The samples were injected twice along with a THF+0.05% toluene blank.

The amount (wt %) of di-adduct in the oligomer was quantified using the preceding GPC system and technique. A calibration curve was obtained using standard solutions containing known amounts of the di-adduct compound (HEA~H12MDI~HEA) in THF. Standard solutions with di-adduct concentrations of 115.2 μg/g, 462.6 μg/g, 825.1 μg/g, and 4180 μg/g were prepared. (As used herein, the dimension "μg/g" refers to μg of di-adduct per gram of total solution (di-adduct+THF)). Two 100 μL aliquots of each di-adduct standard solution were injected into the column to obtain the calibration curve. The retention time of the di-adduct was approximately 23 min and the area of the GPC peak of the di-adduct was measured and correlated with di-adduct concentration. A linear correlation of peak area as a function of di-adduct concentration was obtained (correlation coefficient ($R^2$)=0.999564).

The di-adduct concentration in the oligomer was determined using the calibration. Samples were prepared by diluting ~0.10 g of oligomeric material in THF to obtain a ~1.5 g test solution. The test solution was run through the GPC instrument and the area of the peak associated with the di-adduct compound was determined. The di-adduct concentration in units of μg/g was obtained from the peak area and the calibration curve, and was converted to wt % by multiplying by the weight (g) of the test solution and dividing by the weight of the sample of oligomer before dilution with THF. The wt % of di-adduct compound in the oligomer was determined to be 5.0 wt %.

Coating Compositions.

The coating compositions of Table 1 were each formulated using a high-speed mixer in an appropriate container heated to 60° C., with a heating band or heating mantle. In each case, the components were weighed into the container using a balance and allowed to mix until the solid components were thoroughly dissolved and the mixture appeared homogeneous. Curable compositions were formulated such that the amounts of oligomer, monomer, photosensitizer, and photoinitiator total 100 wt %; the remaining components were added to the total mixture in units of pph as described above. The oligomer and monomer(s) were blended together for at least 10 minutes at 60° C. Photoinitiator(s), photosensitizer(s), and additives were then added, and blending was continued for one hour. Finally, the adhesion promoter was added, and blending was continued for 30 minutes.

Measured Attributes.

The coating compositions were cured to form planar film samples or coatings on an optical fiber. Several attributes of the curing process and cured products were determined. A description of the methods used to measure the attributes and a summary of the results obtained from the measurements follows. Attributes measured include cure speed, Young's modulus, tensile toughness, tear strength, adhesion (peel force), and degree of cure. Cure speed was measured for each coating composition and other attributes were measured for selected coating compositions.

Cure Speed.

Cure speeds were measured by using FTIR spectroscopy to monitor the conversion of acrylate double bonds to single bonds as a function of time. The area of the —C═C— band extending from 1396 cm$^{-1}$-1419 cm$^{-1}$ was monitored. The band had peak intensity at about 1410 cm$^{-1}$. Cure speed measurements analyze the rate of cure of a material during exposure to curing radiation. Cure speed measurements are related to degree of cure measurements in that the disappearance of the acrylate species is measured. However, the degree of cure is a static measurement, which is performed on a finished cured product. Cure speed is a dynamic measurement that monitors the curing reaction during the curing process as the coating composition evolves to form a coating (cured product). From one perspective, the cure speed can be regarded as a series of degree of cure measurements taken over a period of time during exposure to curing radiation. The end result of the cure speed measurement is a plot of degree of cure vs. time. For purposes of the present description, the degree of cure is expressed as % cure, a quantity described below.

Cure speed data were acquired using a Bruker Vertex 80 FTIR spectrometer operating in Rapid Scan mode. Thin films (1 mil wet thickness) of uncured coating were drawn on an ASI DuraSamplir® equipped with a 3 mm diamond coated zinc selenide DuraDisc® and an Omega CN76000 temperature controller. The sample chamber was purged for ~30 s with house nitrogen. The sample was irradiated for 1 s using a Lesco Super Spot Mk II spot cure system (mercury (Hg) lamp curing source) or a Lesco Cool Cure LED system (395 nm LED curing source). The temperature of the thin film sample of uncured coating composition was 55° C. when curing was initiated and the curing intensity was 4.0 mW/cm$^2$. Exposure time was controlled using a UniBlitz® VS25 with model T132 driver. Spectra were obtained before, during, and after the 1 second exposure at a rate of 1 scan every 35 ms. The sample was then irradiated with a 10 s exposure to complete the cure and monitored for several scans.

Percent cure (% cure) values were calculated from the peak area (PA) of the acrylate band extending from 1396 cm$^{-1}$-1419 cm$^{-1}$ using Eq. (1):

$$\% \text{ cure} = \frac{PA_{uncured} - PA_{sample}}{PA_{uncured} - PA_{fully\ cured}} \times 100 \quad (1)$$

PA$_{uncured}$ corresponds to the uncured peak area before exposure to curing radiation, PA$_{fully\ cured}$ corresponds to the peak area of the fully cured state, and PA$_{sample}$ corresponds to the peak area at intermediate times between the uncured and fully cured states. The % cure represents the time-dependent conversion of acrylate double bonds and may also be referred to herein as conversion or % conversion. Conversion values were calculated independently for each spectrum acquired during the time period monitored and conversion vs. time plots were constructed.

Figure 3:
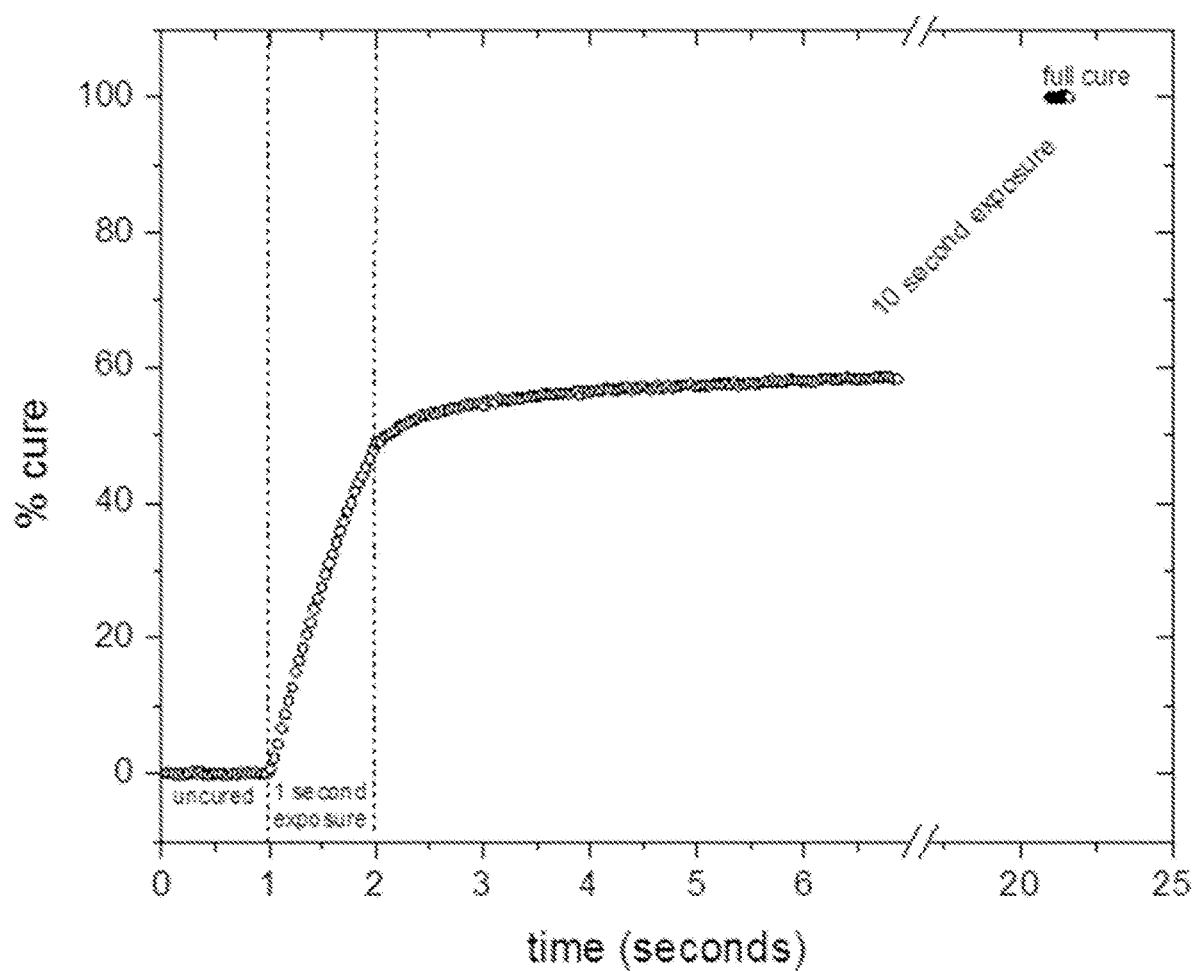
FIG. 3 depicts a schematic conversion plot used to monitor the curing reaction of a coating composition.

A schematic conversion vs. time plot is shown in FIG. 3. Conversion is reported as % cure as defined in the equation above. In the time period between 0 sec and 1 sec, spectra of the uncured composition were acquired and the % cure was zero. At a time of 1 sec, the curing reaction was initiated by exposing the thin film sample of coating composition to curing radiation (mercury (Hg) lamp or 395 nm LED) and allowed to continue for 1 sec. At a time of 2 sec, the curing radiation was turned off. A rapid increase in % cure occurs upon exposure of the coating composition to the curing radiation. The curing process was monitored with the curing source turned off between 2 sec and 7 sec. The curing source was turned on between 7 sec and 17 sec to provide a 10 sec exposure period to finish the cure. No spectra were acquired during the 10 sec exposure period. After the curing source was turned off, spectra of the final state were measured beginning at a time of about 20 sec. In the illustrative example shown in FIG. 3, the % cure after the 10 sec exposure was essentially 100%. Whether or not a fully cured state was obtained under the curing conditions described in FIG. 3 depended on the coating composition. The timing and exposure of cure described for FIG. 3 were used to obtain data for the conversion plots of the coating compositions described herein.

Cure speed is a measure of the rate of the curing reaction and can be obtained from the slope of a conversion plot of the type shown in FIG. 3. As is evident from FIG. 3, the slope changes as the curing reaction proceeds. The evolution of the physical state of the system during the curing reaction influences the cure speed. In the early stages of curing, the coating composition is more fluid (less viscous). As curing proceeds and conversion increases, the coating composition becomes more viscous and ultimately becomes rigid as a solid coating is formed. When the coating composition becomes sufficiently viscous, the curing reaction becomes diffusion limited and cure speed is influenced by both the kinetics of the curing reaction and diffusivity of the compounds in the coating composition.

To avoid the effect of diffusion on cure speed, cure speed is defined on the basis of conversion before the curing reaction becomes diffusion limited. More specifically, cure speed is defined as the slope of the conversion plot between 10% and 40% conversion. The slope of the conversion plot between 10% and 40% conversion was observed to be nearly constant in the measurements performed in the examples described herein (see below). The nearly constant slope indicates that the curing reaction is dominated by the kinetics of the curing reaction for conversions below 40% and that the reaction becomes diffusion limited at some conversion above 40%. Cure speeds reported herein were determined according to this procedure and are reported in units of %/sec, where % refers to % cure. Cure speed results (with standard deviation) are summarized in Table 2.

TABLE 2

| Coating Composition | Cure Speed (Hg lamp) | Cure Speed (LED) |
|---|---|---|
| A | 60 ± 2 | 56 ± 2 |
| B | 68 ± 2 | 68 ± 1 |
| C | 74 ± 2 | 68 ± 2 |
| D | 79 ± 2 | 73 ± 1 |
| E | 59 ± 2 | 58 ± 1 |
| F | <40 | <40 |

The cure speed results indicate that cure speed improvements were seen for coating compositions B, C, and D relative to comparative coating composition A. Coating composition B is a variation of comparative coating composition A that includes a higher concentration of photoinitiator. Faster cure speed typically results from higher photoinitiator concentration, so the higher cure speed observed for coating composition B is an expected result. From a practical standpoint, however, an increase in photoinitiator concentration is not a preferred approach for increasing cure speed because the photoinitiator is an expensive component of the coating composition. It is preferable to achieve higher cure speeds without increasing photoinitiator concentration. Coating composition C has the same photoinitiator concentration as comparative coating composition A and exhibits significantly higher cure speed. The improved cure speed is attributed to replacement of the ethoxylated monofunctional monomer in the coating composition with a propoxylated monofunctional monomer. Coating composition D is a variation of coating composition C that includes a higher concentration of NVC. The higher concentration of NVC leads to a further increase in cure speed and suggests in one aspect that NVC and a propoxylated monofunctional monomer act cooperatively to increase cure speed.

Cure speed of the coating composition, when configured as a wet film with thickness 1 mil and cured with an Hg lamp having intensity 4 mW/cm$^2$, is greater than 60%/s, or greater than 65%/s, or greater than 70%/s, or greater than 75%/s, or in the range from 60%/s-90%/s, or in the range from 65%/s-85%/s, or in the range from 70%/s-80%/s. Cure speed of the coating composition, when configured as a wet film with thickness 1 mil and cured with an LED source operating at 395 nm with intensity 4 mW/cm$^2$, is greater than 60%/s, or greater than 65%/s, or greater than 70%/s, or greater than 75%/s, or in the range from 60%/s-90%/s, or in the range from 65%/s-85%/s, or in the range from 70%/s-80%/s.

Degree of Cure.

Degree of cure is a measure of the extent to which the curing reaction proceeds. Before initiation of the curing reaction, the concentration of acrylate functional groups is high. As the curing reaction proceeds upon initiation, the concentration of acrylate functional groups decreases. A determination of the concentration of acrylate functional groups provides a measure of the extent of the curing reaction. The concentration of acrylate functional groups can be monitored before, after or at any time during the curing reaction.

The degree of cure was measured using the reacted Acrylate Unsaturation (% RAU) method. In the % RAU method, the concentration of acrylate functional groups is assessed by FTIR. Acrylate functional groups include a carbon-carbon double bond with a characteristic absorption frequency in the infrared centered near 810 cm$^{-1}$. The intensity of this characteristic acrylate band is proportional to the concentration of acrylate functional groups. As the curing reaction proceeds, the intensity of the characteristic acrylate band decreases and the magnitude of the decrease is a measure of the degree of cure at any point during the curing reaction.

% RAU was determined by measuring the area of the characteristic acrylate band at 810 cm$^{-1}$. The baseline for the measurement was taken as the tangent line through the absorption minima of the characteristic acrylate band. The area of the characteristic acrylate band was taken as the area of the band above the baseline. To account for background intensity and instrumental effects on the area measurement, the area of a reference band in the 750-780 cm$^{-1}$ region using the baseline of the characteristic acrylate band was measured. The spectral region of the reference band is outside of the absorption range of acrylate functional groups. The ratio R of the area of the characteristic acrylate band to the area of the reference band was determined. This ratio is proportional to the concentration of unreacted acrylated functional groups in the coating composition. The ratio is greatest for the coating composition before initiation of the curing reaction and decreases as the curing reaction proceeds.

% RAU is defined in Eq. (2):

$$\% \ RAU = \frac{(R_L - R_F) \times 100}{R_L} \quad (2)$$

where $R_L$ is the ratio R for the uncured coating composition and $R_F$ is the ratio R for the cured product of the coating composition.

% RAU was measured for primary coatings cured from coating compositions A and D on an optical fiber in a draw process. Each coating composition was separately applied as a primary coating composition to a glass optical fiber as the optical fiber was being drawn. The glass optical fiber had a diameter of 125 μm and the fiber draw speed was 50 m/s. The coating compositions were applied as primary coating compositions to the fiber and were cured using LED sources. Trials were completed using stacks of two or five LED sources. Each LED source was operated at 395 nm, had an intensity of 12 W/cm$^2$, and delivers a dose of approximately 0.06 J/cm$^2$. Subsequent to application and curing of the primary coatings formed from coating compositions A and D, a secondary coating composition was applied to the fiber and cured using a stack of six Hg lamps (Fusion UV sources) to form a secondary coating layer. The thickness of the cured primary coating was 32.5 μm (outer diameter of 190 μm) and the thickness of the cured secondary coating was 27.5 μm (outer diameter of 245 μm). The degree of cure of the primary coatings were then determined. Table 3 gives the draw conditions and degree of cure (expressed as % RAU) for primary coatings formed from coating compositions A and D.

TABLE 3

| Degree of Cure (% RAU) - Primary Coatings | | | | |
|---|---|---|---|---|
| Coating Composition | Draw Speed (m/s) | # LED Lamps (Primary) | # Hg Lamps (Secondary) | % RAU |
| A | 50 | 2 | 6 | 85.5 |
| D | 50 | 2 | 6 | 99.6 |
| A | 50 | 5 | 6 | 91.5 |
| D | 50 | 5 | 6 | 100 |

The degree of cure results indicate that for the same draw conditions and configuration of curing sources, primary coatings formed from coating composition D have a significantly higher degree of cure than primary coatings formed from comparative coating composition A. Particularly noteworthy is the fact that the degree of cure of the primary coating made from coating composition D using 2 LED lamps for curing is higher than the degree of cure of the primary coating made from coating composition A using 5 LED lamps for curing. The results indicate that fewer LED lamps are needed to achieve a particular degree of cure when using coating composition D relative to coating composition A. A smaller number of LED lamps is advantageous because it reduces the complexity of the processing system and allows for a more compact manufacturing platform.

Young's Modulus, Tensile Toughness, and Tear Strength.

Young's modulus was measured on films formed by curing coating compositions A and D. Wet films of each coating composition were cast on silicone release paper with the aid of a draw-down box having a gap thickness of about 0.005". The wet films were cured with a UV dose of 1.2 J/cm$^2$ (measured over a wavelength range of 225-424 nm by a Light Bug model IL490 from International Light) using a Fusion Systems UV curing apparatus with a 600 W/in D-bulb (50% Power and approximately 12 ft/min belt speed) to yield cured coatings in film form. Cured film thickness was between about 0.0030" and 0.0035".

The films were allowed to age (23° C., 50% relative humidity) for at least 16 hours prior to testing. Film samples were cut to dimensions of 12.5 cm×13 mm using a cutting template and a scalpel. Young's modulus and tensile toughness were measured on the film samples using a MTS Sintech tensile test instrument following procedures set forth in ASTM Standard D882-97. Young's modulus is defined as the steepest slope of the beginning of the stress-strain curve. Tensile toughness is defined as the integrated area under the stress-strain curve. Films were tested at an elongation rate of 2.5 cm/min with the initial gauge length of 5.1 cm.

Tear strength of films formed from coating compositions A and D was measured. Tear strength ($G_c$) is related to the force required to break the coating when the coating is under tension. The tear strength can be calculated from Eq. (1):

$$G_c = \frac{\left(\frac{F_{break}}{B \cdot d} \cdot C \cdot \sqrt{\pi \frac{b}{2}}\right)^2}{S} \quad (1)$$

where $F_{break}$ is the force at break, b is the slit length, d is the film thickness, B is the width of the test piece. B and b are instrument parameters with values given below. S is the segment modulus calculated from the stresses at elongations of 0.05% and 2%, and C is a sample geometry factor defined as follows for the technique used herein to determine tear strength:

$$C = \sqrt{\frac{1}{\cos\left(\frac{\pi b}{2B}\right)}} \quad (2)$$

Tear strength ($G_c$) was measured with a MTS Sintech tensile tester. Each coating composition was cast on a glass plate with the aid of a draw-down box having a gap thickness of about 0.005" and immediately cured under UV irradiation using a dose of 1 J/cm². The shape and dimensions of the cured films were prepared according to the International Standard ISO 816 (second edition 1983-12-01) "Determination of tear strength of small test pieces (Delft test pieces)". The cured films were conditioned at 23° C.±2° C. and 50% relative humidity (RH) for at least 16 hours. The initial gauge length was 5.0 cm and test speed was set at 0.1 mm/min. Three to five specimens of each film were tested. Tear strength ($G_c$) was calculated from Eqs. (1) and (2). For the test instrument used in the measurements, slit length b was 5.0 mm, width B of the test piece was 9.0 mm, and sample geometry factor C was 1.247.

Young's modulus, tensile toughness, and tear strength measured for films formed from coating compositions A and D are summarized in Table 4.

TABLE 4

| | Film Properties | | |
|---|---|---|---|
| Coating Composition | Young's Modulus | Tensile Toughness | Tear Strength |
| A | 0.70 MPa | 838 kJ/m³ | 43 J/m² |
| D | 0.71 MPa | 1140 kJ/m³ | 44 J/m² |

The results indicate that cured products formed form coating composition D maintain the favorable Young's modulus and tear strength of cured products formed from comparative coating composition A, while providing significantly improved tensile toughness and cure speed.

In various embodiments, coatings or cured products prepared from a coating composition in accordance with the present disclosure have a Young's modulus of less than 1.0 MPa, or less than 0.9 MPa, or less than 0.8 MPa, or in the range from 0.4 MPa-1.0 MPa, or in the range from 0.5 MPa-0.9 MPa, or in the range from 0.5 MPa-0.8 MPa, when configured as a cured film having a thickness between 0.0030" and 0.0035".

In various embodiments, coatings or cured products prepared from a coating composition in accordance with the present disclosure have a tear strength of at least 30 J/m², or at least 35 J/m², or at least 40 J/m², or at least 45 J/m², or at least 50 J/m², or in the range from 30 J/m²-60 J/m², or in the range from 35 J/m²-55 J/m², or in the range from 40 J/m²-50 J/m², when configured as a cured film having a thickness between 0.0030" and 0.0035".

In various embodiments, coatings or cured products prepared from a coating composition in accordance with the present disclosure have a tensile toughness greater than 800 kJ/m³, or greater than 900 kJ/m³, or greater than 1000 kJ/m³, or greater than 1100 kJ/m³, or in the range from 800 kJ/m³-1300 kJ/m³, or in the range from 900 kJ/m³-1250 kJ/m³, or in the range from 1000 kJ/m³-1200 kJ/m³, when configured as a cured film having a thickness between 0.0030" and 0.0035".

In various embodiments, coatings or cured products prepared from a coating composition in accordance with the present disclosure have a Young's modulus of less than 1.0 MPa and a tear strength of at least 35 J/m², or a Young's modulus of less than 0.9 MPa and a tear strength of at least 35 J/m², or a Young's modulus of less than 0.8 MPa and a tear strength of at least 35 J/m², or a Young's modulus of less than 1.0 MPa and a tear strength of at least 40 J/m², or a Young's modulus of less than 0.9 MPa and a tear strength of at least 40 J/m², or a Young's modulus of less than 0.8 MPa and a tear strength of at least 40 J/m², or a Young's modulus of less than 1.0 MPa and a tear strength of at least 45 J/m², or a Young's modulus of less than 0.9 MPa and a tear strength of at least 45 J/m², or a Young's modulus of less than 0.8 MPa and a tear strength of at least 45 J/m², when configured as a cured film having a thickness between 0.0030" and 0.0035".

In various embodiments, coatings or cured products prepared from a coating composition in accordance with the present disclosure have a Young's modulus in the range from 0.5 MPa-0.9 MPa and a tear strength in the range from 30 J/m²-60 J/m², or a Young's modulus in the range from 0.5 MPa-0.9 MPa and a tear strength in the greater than 35 J/m², or a Young's modulus in the range from 0.5 MPa-0.9 MPa and a tear strength in the range from 35 J/m²-55 J/m², or a Young's modulus in the range from 0.5 MPa-0.9 MPa and a tear strength greater than 40 J/m², or a Young's modulus in the range from 0.5 MPa-0.9 MPa and a tear strength in the range from 40 J/m²-50 J/m², or a Young's modulus in the range from 0.5 MPa-0.9 MPa and a tear strength greater than 45 J/m², when configured as a cured film having a thickness between 0.0030" and 0.0035".

In various embodiments, coatings or cured products prepared from a coating composition in accordance with the present disclosure have a Young's modulus of less than 1.0 MPa and a tensile toughness greater than 900 kJ/m³, or a Young's modulus of less than 0.9 MPa and a tensile toughness greater than 900 kJ/m³, or a Young's modulus of less than 0.8 MPa and a tensile toughness greater than 900 kJ/m³, or a Young's modulus of less than 1.0 MPa and a tensile toughness greater than 1000 kJ/m³, or a Young's modulus of less than 0.9 MPa and a tensile toughness greater than 1000 kJ/m³, or a Young's modulus of less than 0.8 MPa and a tensile toughness greater than 1000 kJ/m³, or a Young's modulus of less than 1.0 MPa and a tensile toughness greater than 1100 kJ/m³, or a Young's modulus of less than 0.9 MPa and a tensile toughness greater than 1100 kJ/m³, or a Young's modulus of less than 0.8 MPa and a tensile toughness greater than 1100 kJ/m³, when configured as a cured film having a thickness between 0.0030" and 0.0035".

In various embodiments, coatings or cured products prepared from a coating composition in accordance with the present disclosure have a Young's modulus in the range from 0.5 MPa-0.9 MPa and a tensile toughness greater than 900 kJ/m³, or a Young's modulus in the range from 0.5 MPa-0.9 MPa and a tensile toughness greater than 1000 kJ/m³, or a Young's modulus in the range from 0.5 MPa-0.9 MPa and a tensile toughness greater than 1100 kJ/m³, or a Young's modulus in the range from 0.5 MPa-0.9 MPa and a tensile toughness in the range from 800 kJ/m³-1300 kJ/m³, or a Young's modulus in the range from 0.5 MPa-0.9 MPa and a tensile toughness in the range from 900 kJ/m³-1250 kJ/m³, or a Young's modulus in the range from 0.5 MPa-0.9 MPa and a tensile toughness in the range from 1000 kJ/m³-1200 kJ/m$^3$, when configured as a cured film having a thickness between 0.0030" and 0.0035".

In various embodiments, coatings or cured products prepared from a coating composition in accordance with the present disclosure have a tear strength greater than 35 J/m$^2$ and a tensile toughness greater than 900 kJ/m$^3$, or a tear strength greater than 40 J/m$^2$ and a tensile toughness greater than 900 kJ/m$^3$, or a tear strength greater than 45 J/m$^2$ and a tensile toughness greater than 900 kJ/m$^3$, or a tear strength greater than 35 J/m$^2$ and a tensile toughness greater than 1000 kJ/m$^3$, or a tear strength greater than 40 J/m$^2$ and a tensile toughness greater than 1000 kJ/m$^3$, or a tear strength greater than 45 J/m$^2$ and a tensile toughness greater than 1000 kJ/m$^3$, or a tear strength greater than 35 J/m$^2$ and a tensile toughness greater than 1100 kJ/m$^3$, or a tear strength greater than 40 J/m$^2$ and a tensile toughness greater than 1100 kJ/m$^3$, or a tear strength greater than 45 J/m$^2$ and a tensile toughness greater than 1100 kJ/m$^3$, when configured as a cured film having a thickness between 0.0030" and 0.0035".

In various embodiments, coatings or cured products prepared from a coating composition in accordance with the present disclosure have a tear strength in the range from 30 J/m$^2$-60 J/m$^2$ and a tensile toughness in the range from 900 kJ/m$^3$-1250 kJ/m$^3$, or a tear strength greater than 30 J/m$^2$-60 J/m$^2$ and a tensile toughness in the range from 1000 kJ/m$^3$-1200 kJ/m$^3$, or a tear strength in the range from 35 J/m$^2$-55 J/m$^2$ and a tensile toughness in the range from 900 kJ/m$^3$-1250 kJ/m$^3$, or a tear strength greater than 35 J/m$^2$-55 J/m$^2$ and a tensile toughness in the range from 1000 kJ/m$^3$-1200 kJ/m$^3$, when configured as a cured film having a thickness between 0.0030" and 0.0035".

Peel Force.

Stripping performance relates to the ability to strip a coating from an optical fiber. Stripping is a common operation that is used in splicing fibers and attaching connectors to optical fibers. It is desirable for the fiber coating to be removed cleanly from the optical fiber during stripping without leaving debris on the surface of the fiber. The strength of adhesion is a measure of strippability of a coating from a fiber.

Adhesion of coatings formed from the coating composition D to an EAGLE XG 2000S (alkaline earth boro-aluminosilicate, available from Corning, Inc.) glass plate (700 μm thick) was measured by a 90 degree peel force test, based on the ASTM D413 standard. Glass plates were pre-heated to test temperatures of 20° C., 60° C., 90° C., and 120° C. respectively. Samples of coating composition D were cast on the pre-heated glass plates with the aid of a draw-down box having a gap thickness of about 0.005" and immediately cured under UV irradiation with an Hg lamp at a dose of 1.2 J/cm$^2$. The cured films were cooled to room temperature (~20° C.). The thickness of the cured films was 75 μm-90 μm. The peel tests were performed at room temperature on a MTS Sintech tensile tester. The glass plate was secured horizontally, and a 1 inch width of coating was then peeled at an angle of 90 degrees from the glass plate at a rate of 2.0 inch/min. The force needed for peeling was determined.

Figure 4:
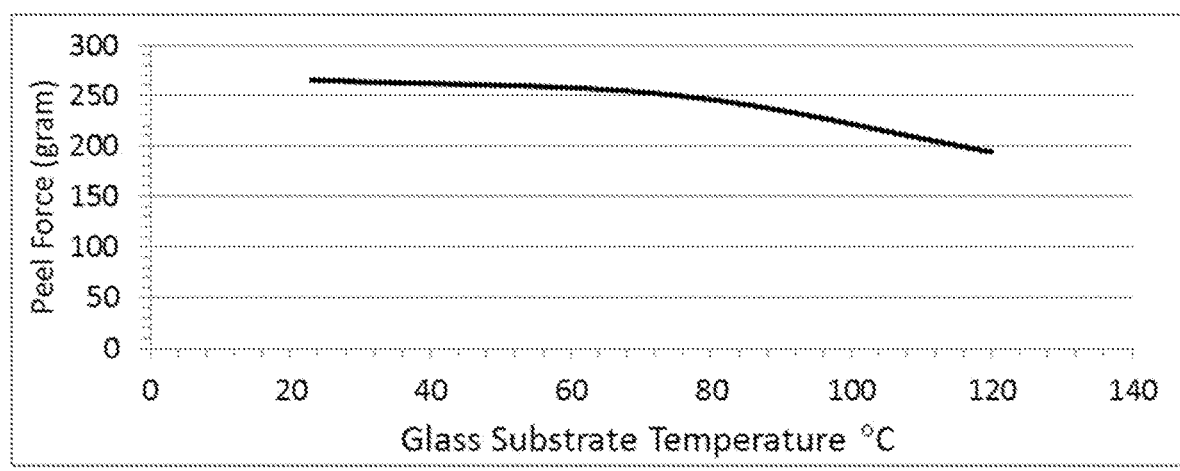
FIG. 4 shows the peel force of a cured film prepared from a coating composition at different temperatures of application of the coating composition to a glass plate.

The results of the peel force test are shown in FIG. 4 for a cured film made from coating compositions D. The plot presented in FIG. 4 shows the 90 degree peel force (reported in units of grams of force needed to peel a 1-inch width of the cured film) of the coatings as a function of the temperature of the glass plate. The results indicate that the cured film made with coating composition D has a peel force that decreases with increasing temperature. The decrease in peel force indicates that adhesion of the cured film to the glass plate weakens with increasing temperature of the glass plate.

Weaker adhesion at higher glass temperatures is advantageous for fiber draw processes. For a fixed draw configuration, as draw speed increases, the temperature of the glass fiber when it enters the coating die containing the primary coating composition increases. The primary coating composition is thus applied to a hotter glass fiber as draw speed increases. When conventional primary coating compositions are applied to glass fibers, an increase in adhesion is typically observed and stripping of the coating becomes more difficult as draw speed increases. When using the present primary coating compositions, however, adhesion decreases with increasing glass temperature and improved stripping is expected.

The 90 degree peel force of coatings or cured products made from the present coatings, when formed as a cured film having a thickness 75 μm-90 μm on EAGLE XG 2000S glass (700 μm thick) at a temperature of 70° C. and measured according to the ASTM D413 standard at 20° C., is less than 300 grams/inch, or less than 280 grams/inch, or less than 260 grams/inch, or in the range from 175 grams/inch to 300 grams/inch, or in the range from 200 grams/inch to 275 grams/inch, where grams/inch refers to force expressed in units of grams per inch of width of the cured film.

The 90 degree peel force of coatings or cured products made from the present coatings, when formed as a cured film having a thickness 75 μm-90 μm on EAGLE XG 2000S glass (700 μm thick) at a temperature of 90° C. and measured according to the ASTM D413 standard at 20° C., is less than 300 grams/inch, or less than 275 grams/inch, or less than 250 grams/inch, or in the range from 150 grams/inch to 300 grams/inch, or in the range from 200 grams/inch to 250 grams/inch, where grams/inch refers to force expressed in units of grams per inch of width of the cured film.

The 90 degree peel force of coatings or cured products made from the present coatings, when formed as a cured film having a thickness 75 μm-90 μm on EAGLE XG 2000S glass (700 μm thick) at a temperature of 120° C. and measured according to the ASTM D413 standard at 20° C., is less than 300 grams/inch, or less than 250 grams/inch, or less than 225 grams/inch, or less than 200 grams/inch, or in the range from 150 grams/inch to 300 grams/inch, or in the range from 175 grams/inch to 250 grams/inch, where grams/inch refers to force expressed in units of grams per inch of width of the cured film.

Clause 1 of the present disclosure extends to:
A composition comprising:
  (i) an oligomer, the oligomer comprising:
  a polyether urethane diacrylate compound having the formula:

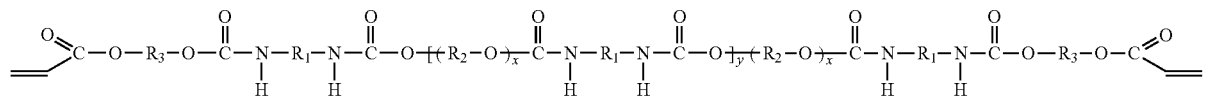

and a di-adduct compound having the formula:

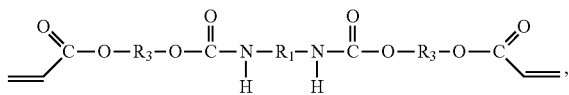

wherein
$R_1$, $R_2$ and $R_3$ are independently selected from linear alkylene groups, branched alkylene groups, or cyclic alkylene groups;
y is 1, 2, 3, or 4;
x is greater than 40;
the di-adduct compound is present in the oligomer in an amount of at least 1.0 wt %, and
the oligomer is present in the composition in an amount greater than 30 wt %; and
(ii) a monomer, the monomer comprising an alkoxylated compound having the formula

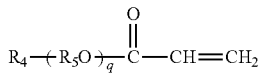

wherein $R_4$ is a linear or branched alkyl group, $R_5$ is a linear or branched alkylene group, q is in the range from 1-10, and the monomer is present in the composition in an amount greater than 25 wt %

Clause 2 of the present disclosure extends to:
The composition of clause 1, wherein the group $R_1$ comprises a 4,4'-methylenebis(cyclohexyl) group.

Clause 3 of the present disclosure extends to:
The composition of clause 1 or 2, wherein the group $R_2$ is a propylene group.

Clause 4 of the present disclosure extends to:
The composition of any of clauses 1-4, wherein x is in the range from 80-140.

Clause 5 of the present disclosure extends to:
The composition of any of clauses 1-4, wherein y is 1 or 2.

Clause 6 of the present disclosure extends to:
The composition of any of clauses 1-5, wherein the di-adduct compound is present in the oligomer in an amount greater than 2.0 wt %.

Clause 7 of the present disclosure extends to:
The composition of any of clauses 1-5, wherein the di-adduct compound is present in the oligomer in an amount greater than 3.0 wt %.

Clause 8 of the present disclosure extends to:
The composition of any of clauses 1-7, wherein the oligomer is present in the composition in an amount greater than 40 wt %.

Clause 9 of the present disclosure extends to:
The composition of any of clauses 1-7, wherein the oligomer is present in the composition in an amount in the range from 40 wt %-60 wt %.

Clause 10 of the present disclosure extends to:
The composition of any of clauses 1-9, wherein the group $R_4$ is

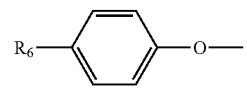

and the group $R_6$ is an alkyl group having 4-20 carbon atoms.

Clause 11 of the present disclosure extends to:
The composition of clause 10, wherein the group $R_6$ has 6-12 carbon atoms.

Clause 12 of the present disclosure extends to:
The composition of any of clauses 1-11, wherein the group $R_5$ is an alkylene group with 3-6 carbon atoms.

Clause 13 of the present disclosure extends to:
The composition of any of clauses 1-11, wherein the group $R_5$ is

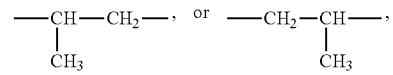

or a combination thereof.

Clause 14 of the present disclosure extends to:
The composition of any of clauses 1-13, wherein q is in the range from 1-4.

Clause 15 of the present disclosure extends to:
The composition of any of clauses 1-14, wherein the composition of the monomer in the composition is greater than 45 wt %.

Clause 16 of the present disclosure extends to:
The composition of any of clauses 1-15, further comprising an N-vinyl amide compound.

Clause 17 of the present disclosure extends to:
The composition of any of clauses 16, wherein the N-vinyl amide compound is N-vinyl caprolactam.

Clause 18 of the present disclosure extends to:
The composition of any of clauses 16 or 17, wherein the N-vinyl amide compound is present in the composition in an amount greater than 1.0 wt %.

Clause 19 of the present disclosure extends to:
The composition of any of clauses 1-18, further comprising a photoinitiator.

Clause 20 of the present disclosure extends to:
A cured product of a composition comprising:
(i) an oligomer, the oligomer comprising:
a polyether urethane diacrylate compound having the formula:

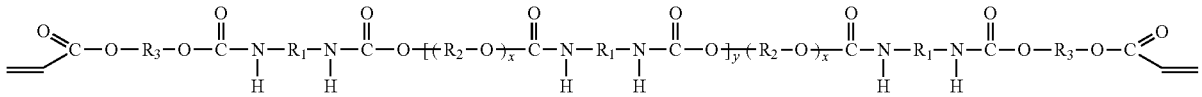

and a di-adduct compound having the formula:

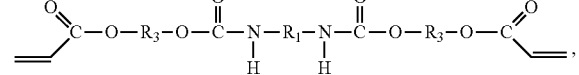

wherein $R_1$, $R_2$ and $R_3$ are independently selected from linear alkylene groups, branched alkylene groups, or cyclic alkylene groups;

y is 1, 2, 3, or 4;

x is greater than 40;

the di-adduct compound is present in the oligomer in an amount of at least 2.0 wt %, and the oligomer is present in the composition in an amount greater than 30 wt %;

(ii) a monomer, the monomer comprising an alkoxylated compound having the formula

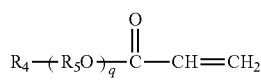

wherein $R_4$ is a linear or branched alkyl group, $R_5$ is a linear or branched alkylene group, q is in the range from 1-10; and the monomer is present in the composition in an amount greater than 35 wt %; and (iii) a photoinitiator.

Clause 21 of the present disclosure extends to:
The cured product of clause 20, wherein the group $R_1$ comprises a 4,4'-methylenebis(cyclohexyl) group.

Clause 22 of the present disclosure extends to:
The cured product of clause 20 or 21, wherein the group $R_2$ is a propylene group.

Clause 23 of the present disclosure extends to:
The cured product of any of clauses 20-22, wherein x is in the range from 80-140.

Clause 24 of the present disclosure extends to:
The cured product of any of clauses 20-23, wherein y is 1 or 2.

Clause 25 of the present disclosure extends to:
The cured product of any of clauses 20-24, wherein the group $R_4$ is

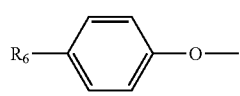

and the group $R_6$ is an alkyl group having 6-12 carbon atoms.

Clause 26 of the present disclosure extends to:
The cured product of any of clauses 20-25, wherein the group $R_5$ is

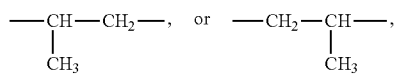

or a combination thereof.

Clause 27 of the present disclosure extends to:
The cured product of any of clauses 20-26, wherein q is in the range from 1-4.

Clause 28 of the present disclosure extends to:
The cured product of any of clauses 20-27, wherein the composition further comprises an N-vinyl amide compound.

Clause 29 of the present disclosure extends to:
The cured product of any of clauses 20-28, wherein the cured product has a Young's modulus of less than 1.0 MPa and a tensile toughness greater than 900 $J/m^3$, when configured as a cured film having a thickness between 0.0030" and 0.0035".

Clause 30 of the present disclosure extends to:
The cured product of any of clauses 20-29, wherein the cured product has a tear strength greater than 35 $J/m^2$ and a tensile toughness greater than 900 $J/m^3$, when configured as a cured film having a thickness between 0.0030" and 0.0035".

Clause 31 of the present disclosure extends to:
The cured product of any of clauses 20-30, wherein the cured product has a 90 degree peel force, when formed as a cured film having a thickness of 75 μm-90 μm on EAGLE XG 2000S glass (700 μm thick) at a temperature of 120° C. and measured according to the ASTM D413 standard at 20° C., less than 200 grams/inch.

Clause 32 of the present disclosure extends to:
The cured product of clause 31, wherein the cured product has a 90 degree peel force, when formed as a cured film having a thickness of 75 μm-90 μm on EAGLE XG 2000S (alkaline earth boro-aluminosilicate) glass (700 μm thick) at a temperature of 90° C. and measured according to the ASTM D413 standard at 20° C., less than 250 grams/inch.

Clause 33 of the present disclosure extends to:
A method of forming a cured product comprising curing a composition comprising:

(i) an oligomer, the oligomer comprising:

a polyether urethane diacrylate compound having the formula:

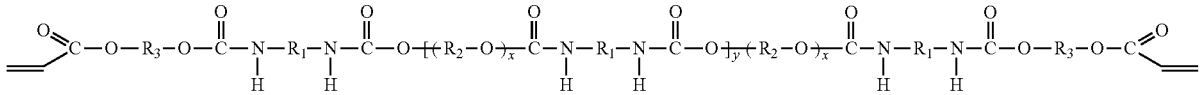

and a di-adduct compound having the formula:

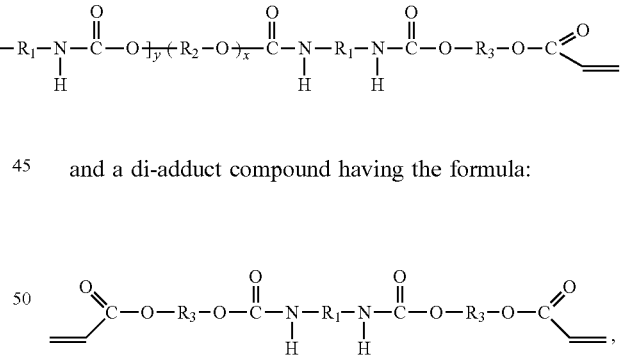

wherein $R_1$, $R_2$ and $R_3$ are independently selected from linear alkylene groups, branched alkylene groups, or cyclic alkylene groups;

y is 1, 2, 3, or 4;

x is greater than 40;

the di-adduct compound is present in the oligomer in an amount of at least 2.0 wt %, and the oligomer is present in the composition in an amount greater than 30 wt %;

(ii) a monomer, the monomer comprising an alkoxylated compound having the formula $$R_4 \text{---} (R_5O)_{q} \text{---} \overset{O}{\underset{\|}{C}} \text{---} CH = CH_2$$

wherein $R_4$ is a linear or branched alkyl group, $R_5$ is a linear or branched alkylene group, q is in the range from 1-10; and the monomer is present in the composition in an amount greater than 35 wt %; and (iii) a photoinitiator.

Clause 34 of the present disclosure extends to:
The method of clause 33, wherein the curing occurs at a speed greater than 65%/s when the composition is configured as a wet film with thickness 1 mil and cured with an Hg lamp having intensity 4 mW/cm².

Clause 35 of the present disclosure extends to:
The method of clause 33, wherein the curing occurs at a speed greater than 65%/s when the composition is configured as a wet film with thickness 1 mil and cured with an LED source operating at 395 nm with intensity 4 mW/cm².

Clause 36 of the present disclosure extends to:
A method of coating an optical fiber comprising:
applying a coating composition to an optical fiber, said optical fiber moving at a draw speed greater than 45 m/s, said coating composition comprising:
(i) an oligomer, the oligomer comprising:
a polyether urethane diacrylate compound having the formula:

wherein $R_4$ is a linear or branched alkyl group, $R_5$ is a linear or branched alkylene group, q is in the range from 1-10; and the monomer is present in the composition in an amount greater than 35 wt %; and (iii) a photoinitiator; and
curing the coating composition to form a coating on the fiber.

Clause 37 of the present disclosure extends to:
The method of clause 36, wherein the curing is completed with an LED source having a operating wavelength between 300 nm and 400 nm and the coating has % Reacted Acrylate Unsaturation (% RAU) greater than 90%.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

$$\overset{O}{\underset{=}{\diagup}} \!\! C\text{---}O\text{---}R_3\text{---}O\text{---}\overset{O}{\underset{\|}{C}}\text{---}\underset{H}{N}\text{---}R_1\text{---}\underset{H}{N}\text{---}\overset{O}{\underset{\|}{C}}\text{---}O\text{---}(R_2\text{---}O)_x\text{---}\overset{O}{\underset{\|}{C}}\text{---}\underset{H}{N}\text{---}R_1\text{---}\underset{H}{N}\text{---}\overset{O}{\underset{\|}{C}}\text{---}O\text{---}(R_2\text{---}O)_x\text{---}\overset{O}{\underset{\|}{C}}\text{---}\underset{H}{N}\text{---}R_1\text{---}\underset{H}{N}\text{---}\overset{O}{\underset{\|}{C}}\text{---}O\text{---}R_3\text{---}O\text{---}C\overset{O}{\underset{=}{\diagdown}}$$

and a di-adduct compound having the formula:

$$\overset{O}{\underset{=}{\diagup}} \!\! C\text{---}O\text{---}R_3\text{---}O\text{---}\overset{O}{\underset{\|}{C}}\text{---}\underset{H}{N}\text{---}R_1\text{---}\underset{H}{N}\text{---}\overset{O}{\underset{\|}{C}}\text{---}O\text{---}R_3\text{---}O\text{---}C\overset{O}{\underset{=}{\diagdown}},$$

wherein
$R_1$, $R_2$ and $R_3$ are independently selected from linear alkylene groups, branched alkylene groups, or cyclic alkylene groups;
y is 1, 2, 3, or 4;
x is greater than 40;
the di-adduct compound is present in the oligomer in an amount of at least 2.0 wt %, and
the oligomer is present in the composition in an amount greater than 30 wt %;
(ii) a monomer, the monomer comprising an alkoxylated compound having the formula $$R_4 \text{---} (R_5O)_{q} \text{---} \overset{O}{\underset{\|}{C}} \text{---} CH = CH_2$$

What is claimed is:

1. A composition comprising:
(i) an oligomer, the oligomer comprising:
a polyether urethane diacrylate compound having the formula:

$$\overset{O}{\underset{=}{\diagup}} \!\! C\text{---}O\text{---}R_3\text{---}O\text{---}\overset{O}{\underset{\|}{C}}\text{---}\underset{H}{N}\text{---}R_1\text{---}\underset{H}{N}\text{---}\overset{O}{\underset{\|}{C}}\text{---}O\text{---}(R_2\text{---}O)_x\text{---}$$

$$\text{---}\overset{O}{\underset{\|}{C}}\text{---}\underset{H}{N}\text{---}R_1\text{---}\underset{H}{N}\text{---}\overset{O}{\underset{\|}{C}}\text{---}O\text{---}(R_2\text{---}O)_y\text{---}(R_2\text{---}O)_x\text{---}\overset{O}{\underset{\|}{C}}\text{---}$$

$$\text{---}\underset{H}{N}\text{---}R_1\text{---}\underset{H}{N}\text{---}\overset{O}{\underset{\|}{C}}\text{---}O\text{---}R_3\text{---}O\text{---}C\overset{O}{\underset{=}{\diagdown}}$$

and a di-adduct compound having the formula:

$$\overset{O}{\underset{=}{\diagup}} \!\! C\text{---}O\text{---}R_3\text{---}O\text{---}\overset{O}{\underset{\|}{C}}\text{---}\underset{H}{N}\text{---}R_1\text{---}\underset{H}{N}\text{---}\overset{O}{\underset{\|}{C}}\text{---}O\text{---}R_3\text{---}O\text{---}C\overset{O}{\underset{=}{\diagdown}},$$

wherein
  $R_1$, $R_2$ and $R_3$ are independently selected from linear alkylene groups, branched alkylene groups, or cyclic alkylene groups;
  y is 1, 2, 3, or 4;
  x is greater than 40;
  the di-adduct compound is present in the oligomer in an amount of at least 1.0 wt %, and
  the oligomer is present in the composition in an amount greater than 30 wt %; and
(ii) a monomer, the monomer comprising an alkoxylated compound having the formula

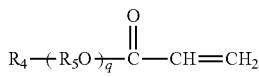

wherein $R_4$ is a linear or branched alkyl group, or a substituted phenol group show by the formula:

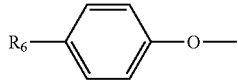

wherein the group $R_6$ is an alkyl group having 4-20 carbon atoms, $R_5$ is a linear or branched alkylene group, q is in the range from 1-10, and the monomer is present in the composition in an amount greater than 25 wt %.

2. The composition of claim 1, wherein the group $R_1$ comprises a 4,4'-methylenebis(cyclohexyl) group wherein the cured product of composition has a tensile toughness greater than 9000 kJ/m$^3$ when configured as a cured film having a thickness of between 0.0030" and 0.0035".

3. The composition of claim 1, wherein the group $R_2$ is a propylene group.

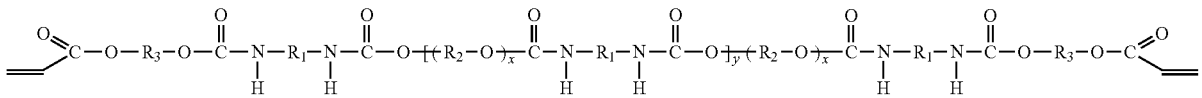

4. The composition of claim 1, wherein x is in the range from 80-140.

5. The composition of claim 1, wherein the di-adduct compound is present in the oligomer in an amount greater than 3.0 wt %.

6. The composition of claim 1, wherein the oligomer is present in the composition in an amount greater than 40 wt %.

7. The composition of claim 1, wherein the group $R_4$ is

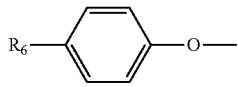

and the group $R_6$ is an alkyl group having 4-20 carbon atoms.

8. The composition of claim 7, wherein the group $R_5$ is an alkylene group with 3-6 carbon atoms.

9. The composition of claim 8, wherein the group $R_5$ is

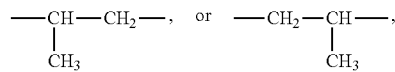

or a combination thereof.

10. The composition of claim 9, wherein q is in the range from 1-4.

11. The composition of claim 1, wherein the monomer is present in the composition in an amount greater than 45 wt %.

12. The composition of claim 1, further comprising an N-vinyl amide compound.

13. The composition of claim 1, further comprising a photoinitiator.

14. A cured product of the composition of claim 13.

15. The cured product of claim 14, wherein the cured product has a Young's modulus of less than 1.0 MPa, when configured as a cured film having a thickness between 0.0030" and 0.0035".

16. The cured product of claim 14, wherein the cured product has a tear strength greater than 35 J/m$^2$, when configured as a cured film having a thickness between 0.0030" and 0.0035".

17. The cured product of claim 14, wherein the cured product has a 90 degree peel force, when formed as a cured film having a thickness of 75 µm-90 µm on EAGLE XG 2000S glass 700 µm thick at a temperature of 120° C. and measured according to the ASTM D413 standard at 20° C., less than 200 grams/inch.

18. A method of coating an optical fiber comprising:
  applying a coating composition to an optical fiber, said optical fiber moving at a draw speed greater than 45 m/s, said coating composition comprising:
    (i) an oligomer, the oligomer comprising:
      a polyether urethane diacrylate compound having the formula:

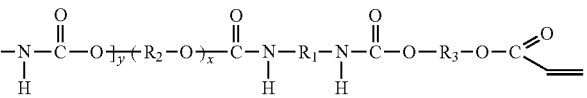

and a di-adduct compound having the formula:

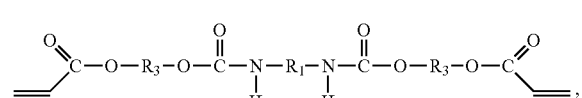

wherein
  $R_1$, $R_2$ and $R_3$ are independently selected from linear alkylene groups, branched alkylene groups, or cyclic alkylene groups;
  y is 1, 2, 3, or 4;
  x is greater than 40;
  the di-adduct compound is present in the oligomer in an amount of at least 2.0 wt %, and
  the oligomer is present in the composition in an amount greater than 30 wt %;

(ii) a monomer, the monomer comprising an alkoxylated compound having the formula

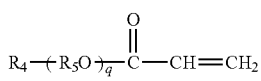

wherein $R_4$ is a linear or branched alkyl group or a substituted phenol group show by the formula:

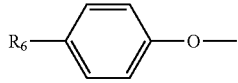

wherein the group $R_6$ is an alkyl group having 4-20 carbon atoms, $R_5$ is a linear or branched alkylene group, q is in the range from 1-10; and the monomer is present in the composition in an amount greater than 35 wt %; and (iii) a photoinitiator; and curing the coating composition to form a coating on the fiber wherein the coating has a tensile toughness greater than 9000 $kJ/m^3$ when configured as a cured film having a thickness of between 0.0030" and 0.0035".

19. A method comprising curing the composition of claim 1 to form a cured product, the curing occurring at a speed greater than 65%/s when the composition is configured as a wet film with thickness 1 mil and cured with an LED source operating at 395 nm with intensity 4 $mW/cm^2$.

20. The method of claim 19, wherein the cured product has % Reacted Acrylate Unsaturation (% RAU) greater than 90%.

* * * * *

UNITED STATES PATENT AND TRADEMARK OFFICE
CERTIFICATE OF CORRECTION

| | |
|---|---|
| PATENT NO. | : 11,555,133 B2 |
| APPLICATION NO. | : 16/266235 |
| DATED | : January 17, 2023 |
| INVENTOR(S) | : Bookbinder et al. |

It is certified that error appears in the above-identified patent and that said Letters Patent is hereby corrected as shown below:

On the Title Page

On the page 2, in Column 2, item (56) under "Other Publications", Line 6, delete "Jounral" and insert -- Journal --.

In the Claims

In Column 43, Line 19 (Approx.), in Claim 1, delete "group," and insert -- group --.

In Column 43, Line 32, in Claim 1, delete "wt %." and insert -- wt % and wherein the composition has a tensile toughness greater than 900 kJ/m$^3$ when configured as a cured film having a thickness of between 0.0030" and 0.0035". --.

In Column 43, Lines 34-37, in Claim 2, delete "group wherein the cured product of composition has a tensile toughness greater than 9000 kJ/m$^3$ when configured as a cured film having a thickness of between 0.0030" and 0.0035"." and insert -- group. --.

In Column 46, Line 7, in Claim 18, delete "9000" and insert -- 900 --.

Signed and Sealed this
First Day of August, 2023

Katherine Kelly Vidal
*Director of the United States Patent and Trademark Office*